G. P. BOSWORTH.
MECHANISM FOR KNITTING GLOVES.
APPLICATION FILED NOV. 20, 1918.

1,428,318.

Patented Sept. 5, 1922.
16 SHEETS—SHEET 4.

Inventor:
George P. Bosworth.
by Emery, Booth, Varney and Varney
Attys.

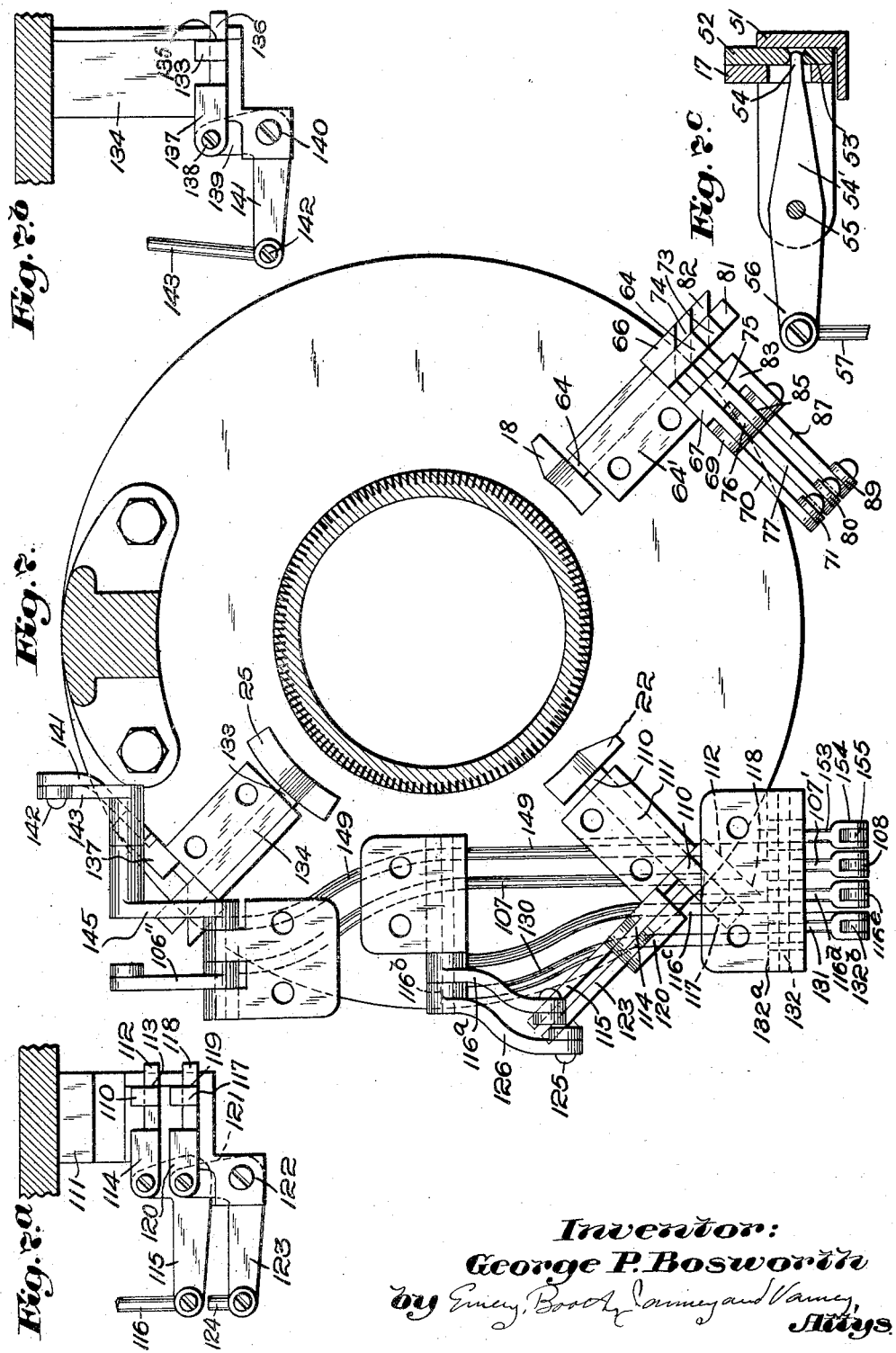

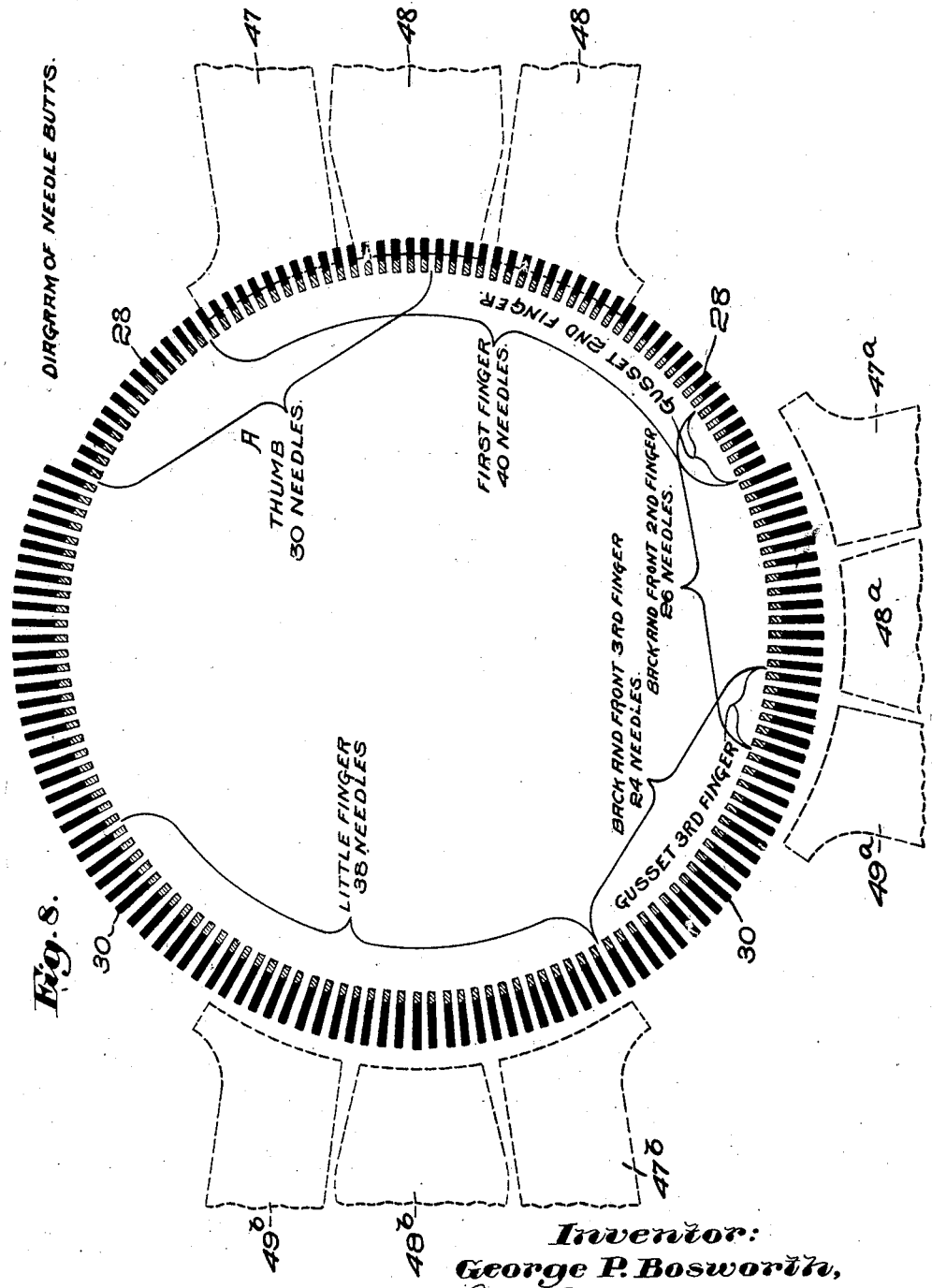

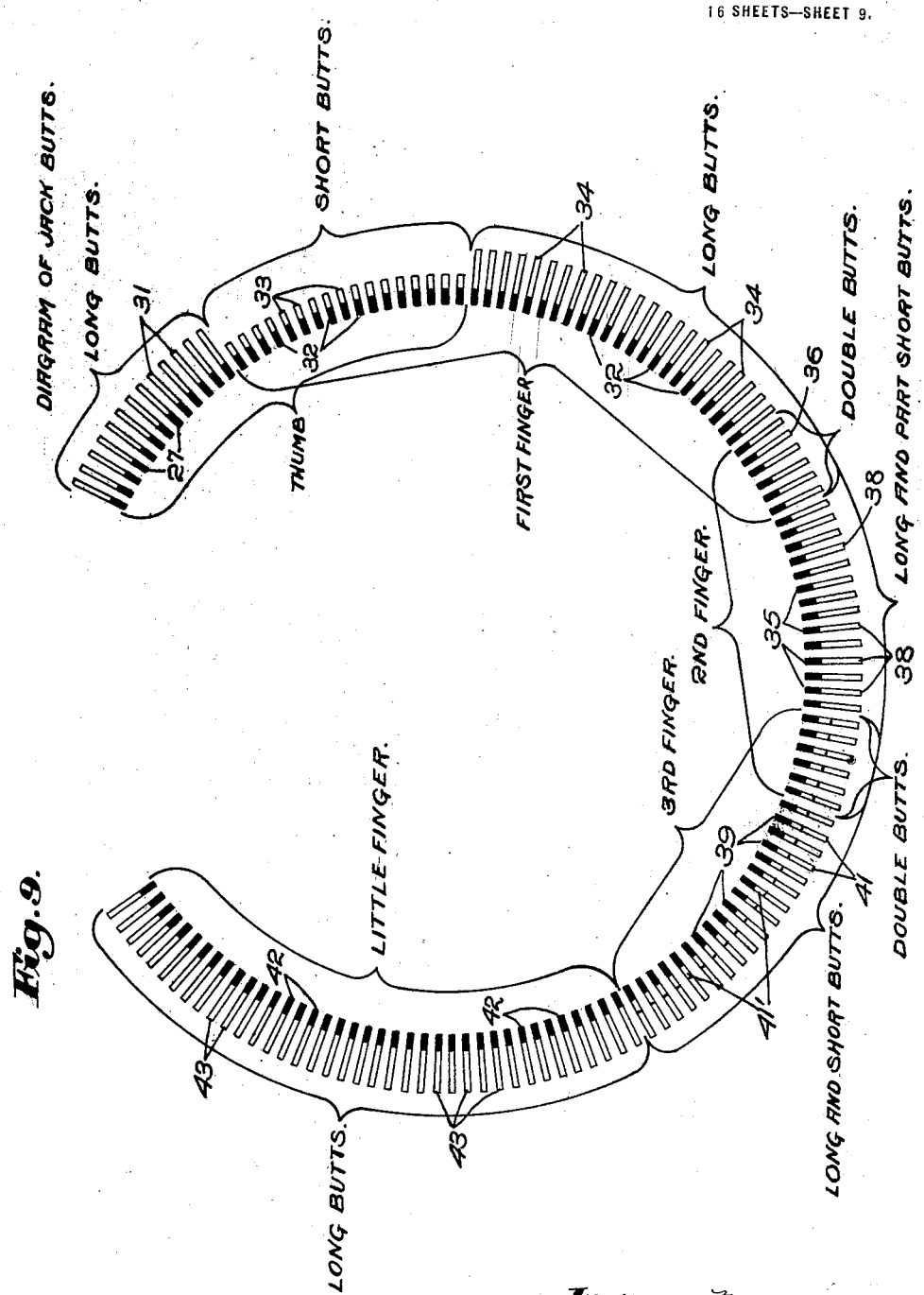

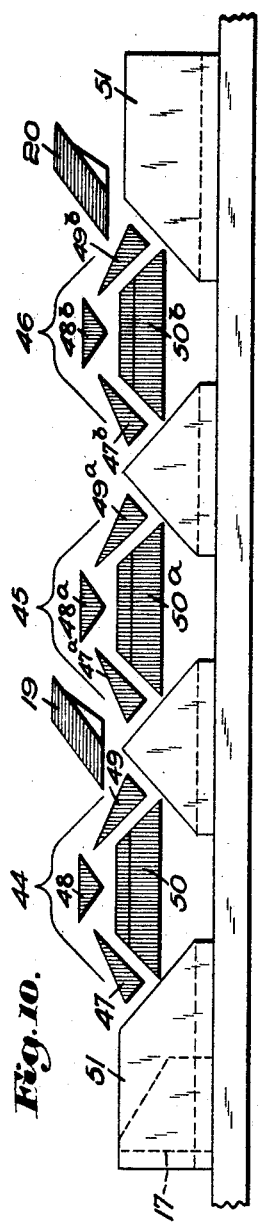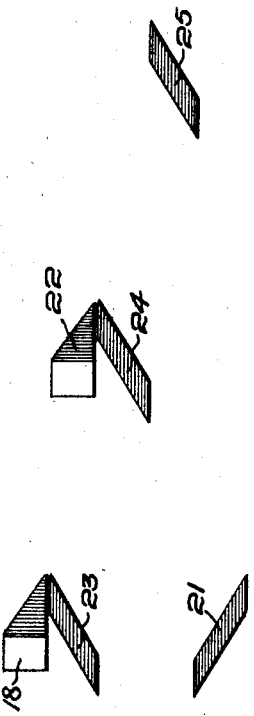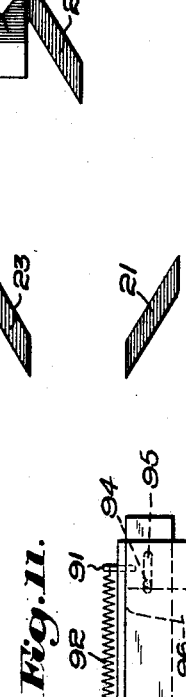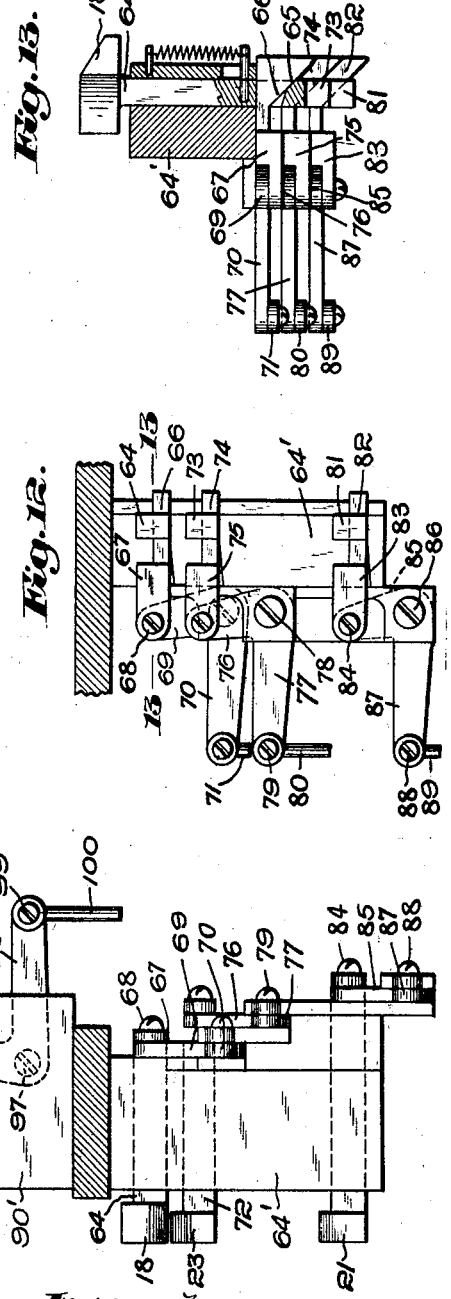

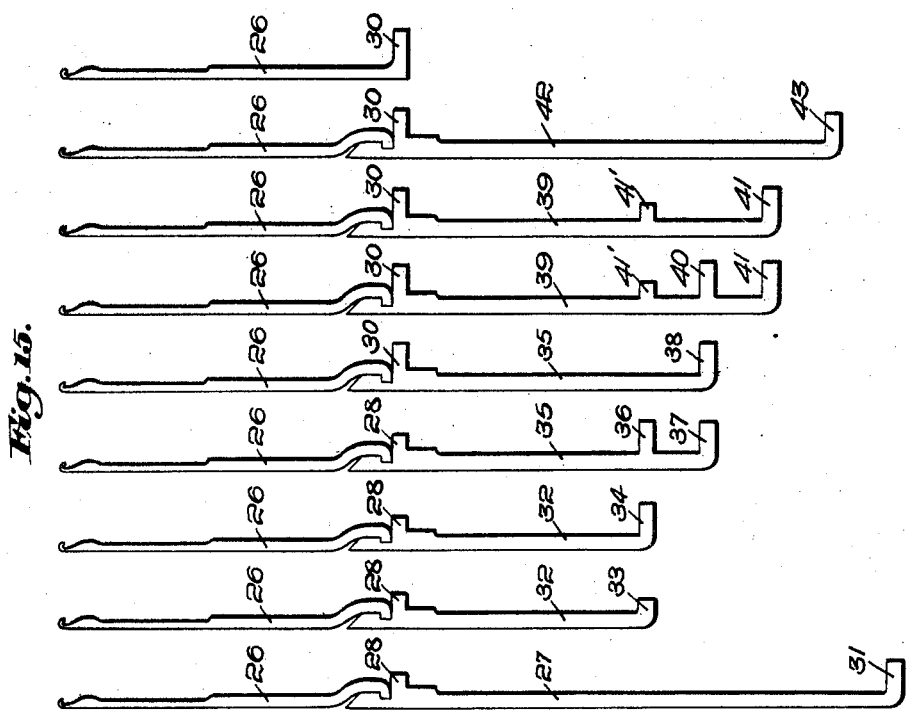

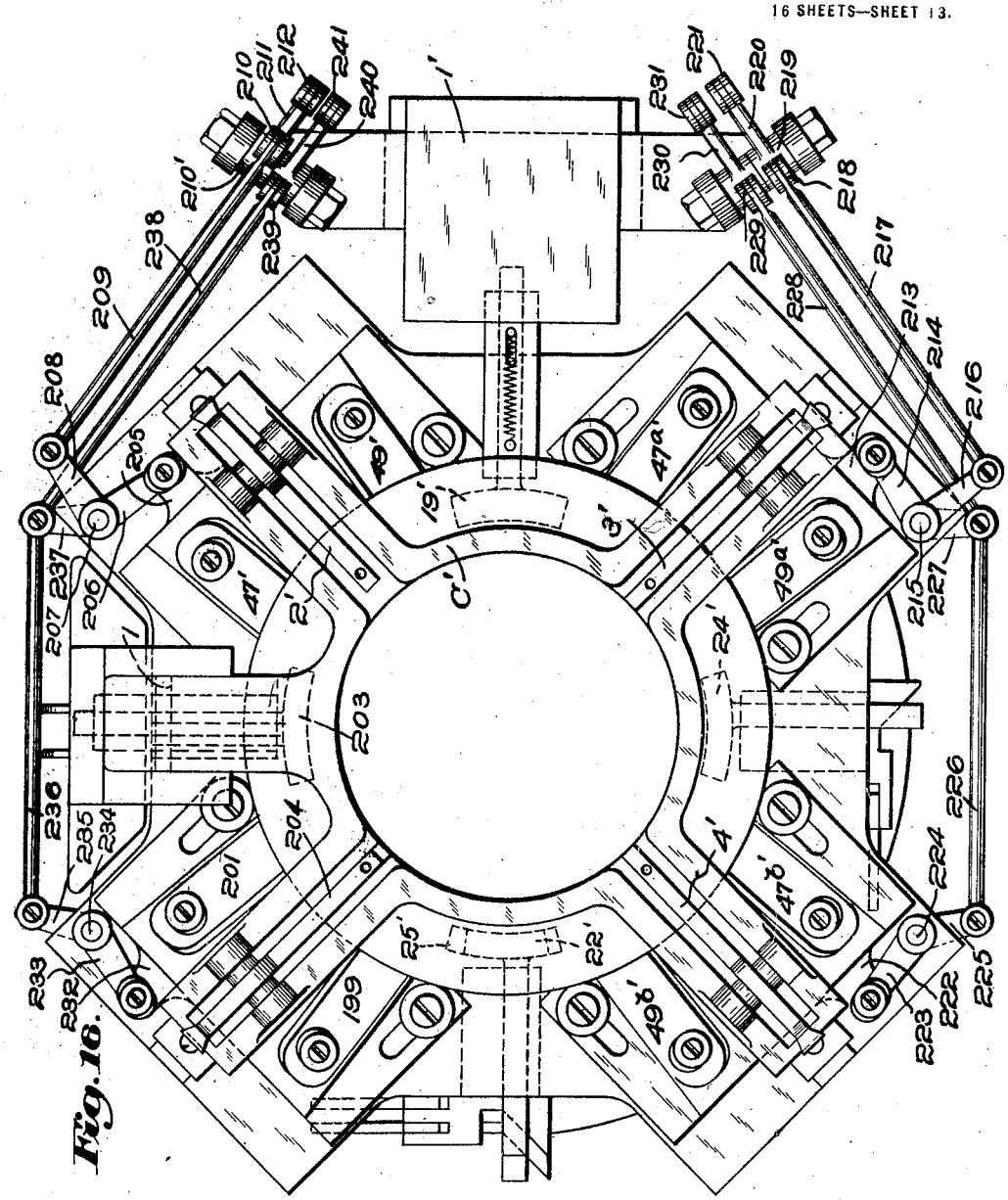

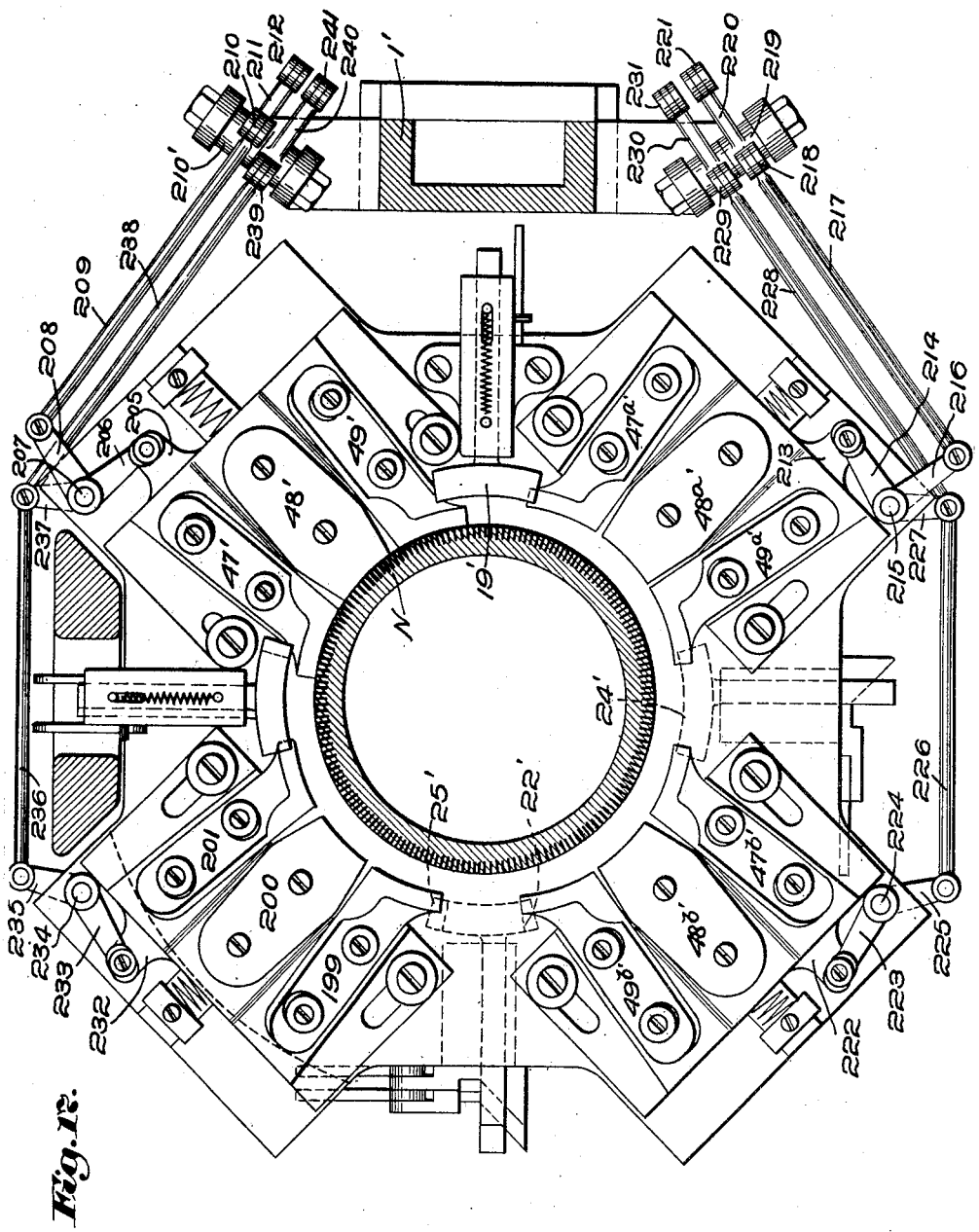

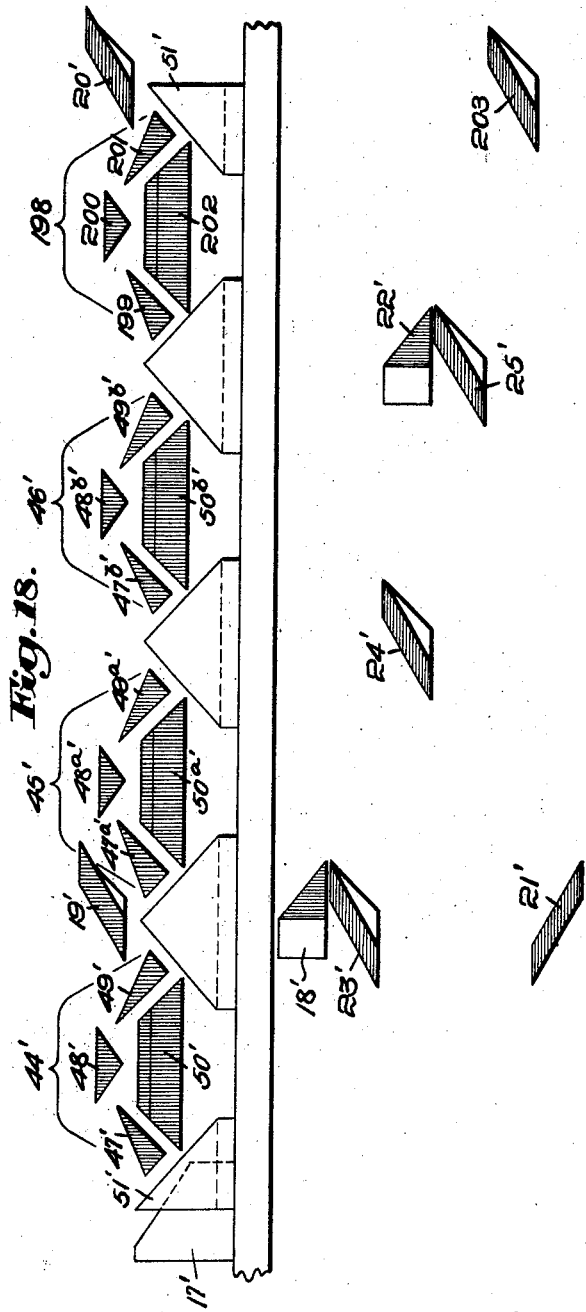

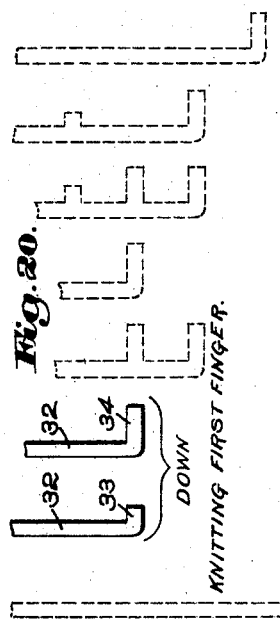
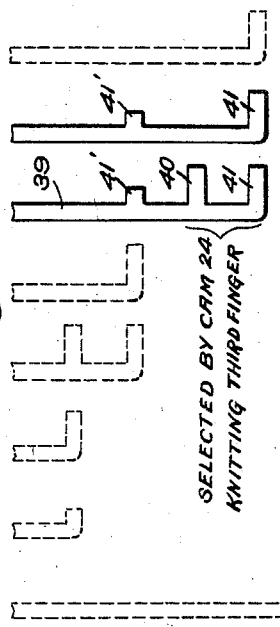
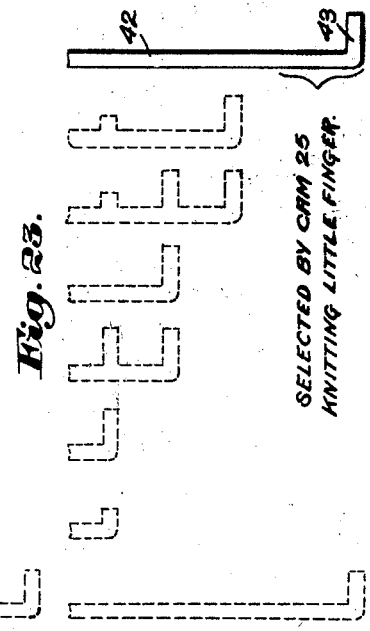
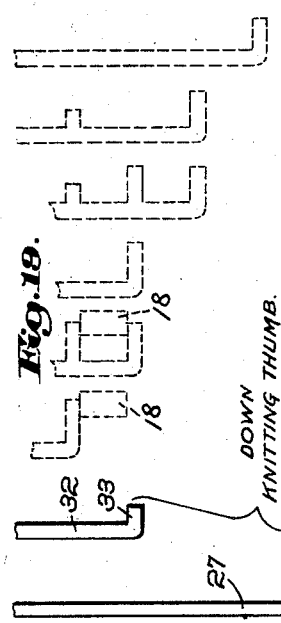
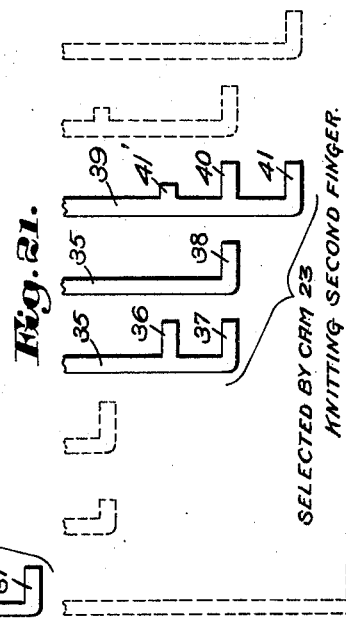

Patented Sept. 5, 1922.

1,428,318

UNITED STATES PATENT OFFICE.

GEORGE P. BOSWORTH, OF CENTRAL FALLS, RHODE ISLAND, ASSIGNOR TO HEMP-HILL COMPANY, OF PAWTUCKET, RHODE ISLAND, A CORPORATION OF MASSACHUSETTS.

MECHANISM FOR KNITTING GLOVES.

Application filed November 20, 1918. Serial No. 263,284.

*To all whom it may concern:*

Be it known that I, GEORGE P. BOSWORTH, a citizen of the United States, and a resident of Central Falls, in the county of Providence and State of Rhode Island, have invented an Improvement in Mechanism for Knitting Gloves, of which the following description, in connection with the accompanying drawings, is a specification, like characters on the drawings representing like parts.

This invention relates to circular knitting machines particularly but not exclusively intended for knitting gloves, and like articles.

In order that the principle of the invention may be readily understood, I have in the accompanying drawings, disclosed two embodiments of the mechanism of my invention.

In the drawings,—

Fig. 1 is a front elevation of a circular knitting machine constituting one embodiment of the mechanism of my invention;

Fig. 1ª is development of the drum having cams for controlling certain of the operative parts and illustrating said cams diagrammatically;

Fig. 7 is a sectional plan view of certain of the non-knitting cams and including the selecting cams and the plural-group withdrawing cams;

Fig. 7ª is a detail in end elevation of one of the group withdrawal cams and one of the group-selecting cams;

Fig. 7ᵇ is a detail in end elevation of another of the group selective cams;

Fig. 7ᶜ is a detail in side elevation and vertical section of one of the cams for rendering the needles inactive, said cam being herein termed a plural-group withdrawing cam;

Fig. 8 is a diagram of the needles in circular series, indicating their aggroupment for the production of the thumb and fingers and indicating their lengths of needle butts.

Figure 3:
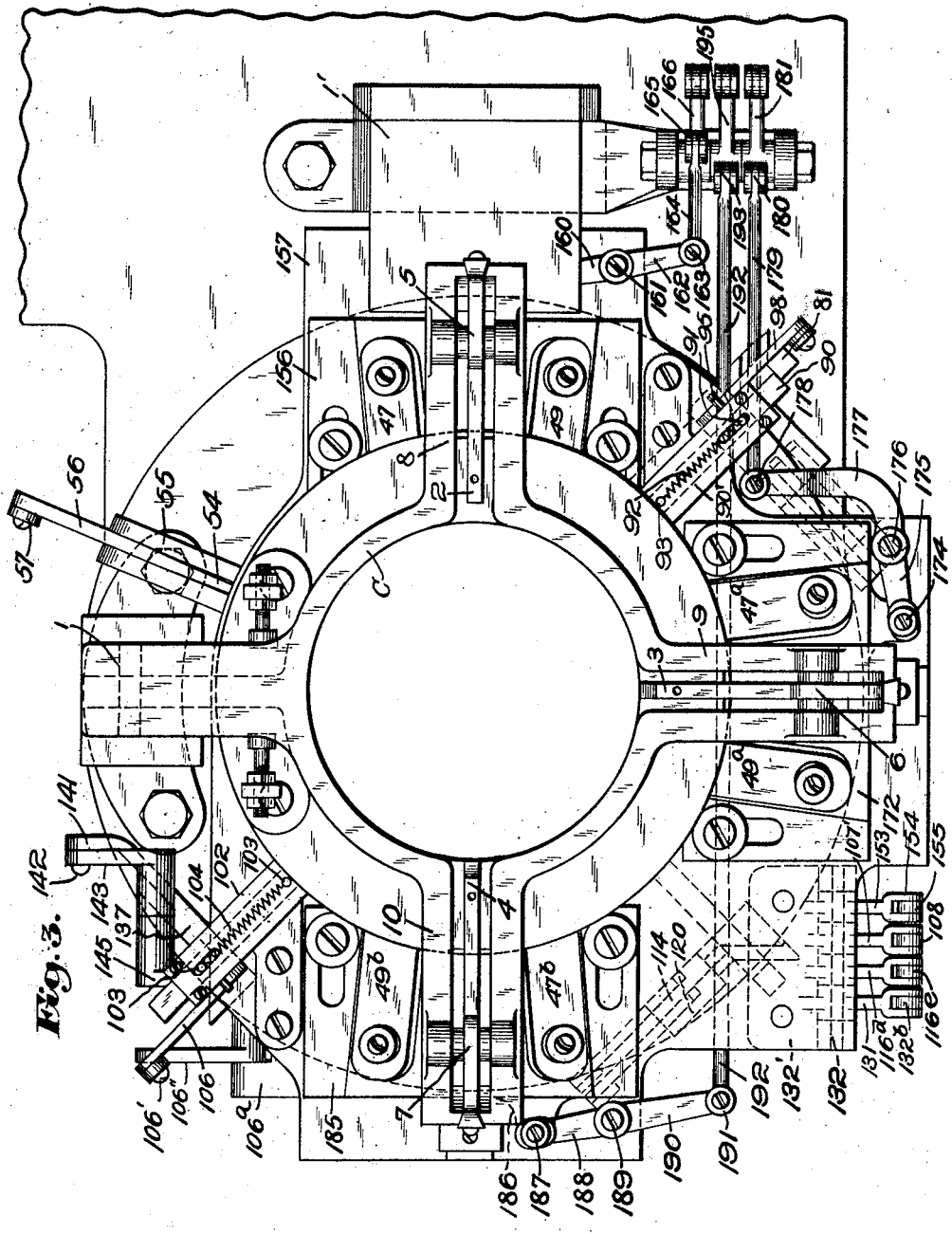
Fig. 3 is a plan view of the knitting head of said machine and representing that form of mechanism having three sets of knitting cams.
Figure 4:
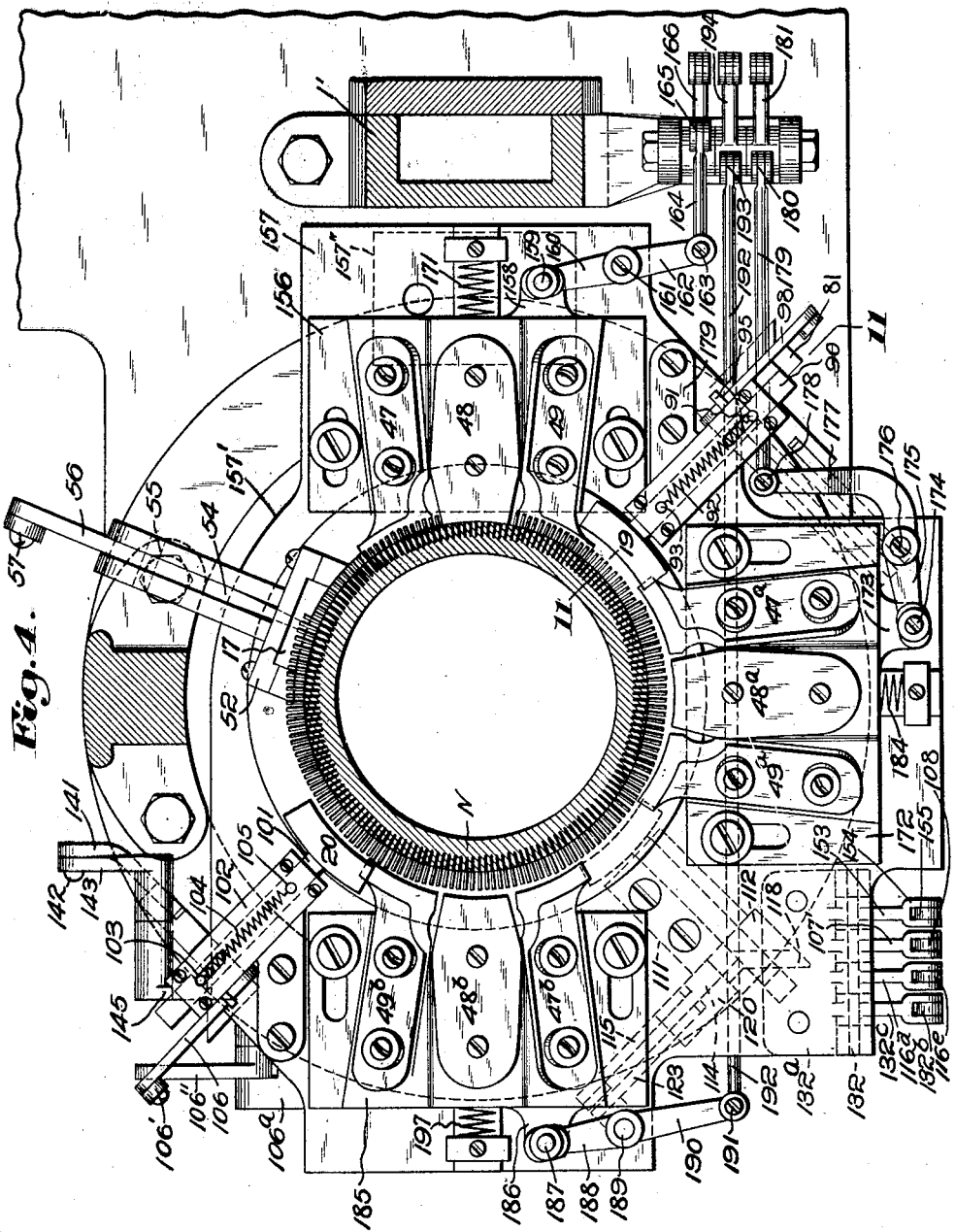
Fig. 4 is a plan view of the machine taken below the latch ring, preferably employed, and representing in plan the knitting and other cams, certain of the parts being in section.
Figure 14:
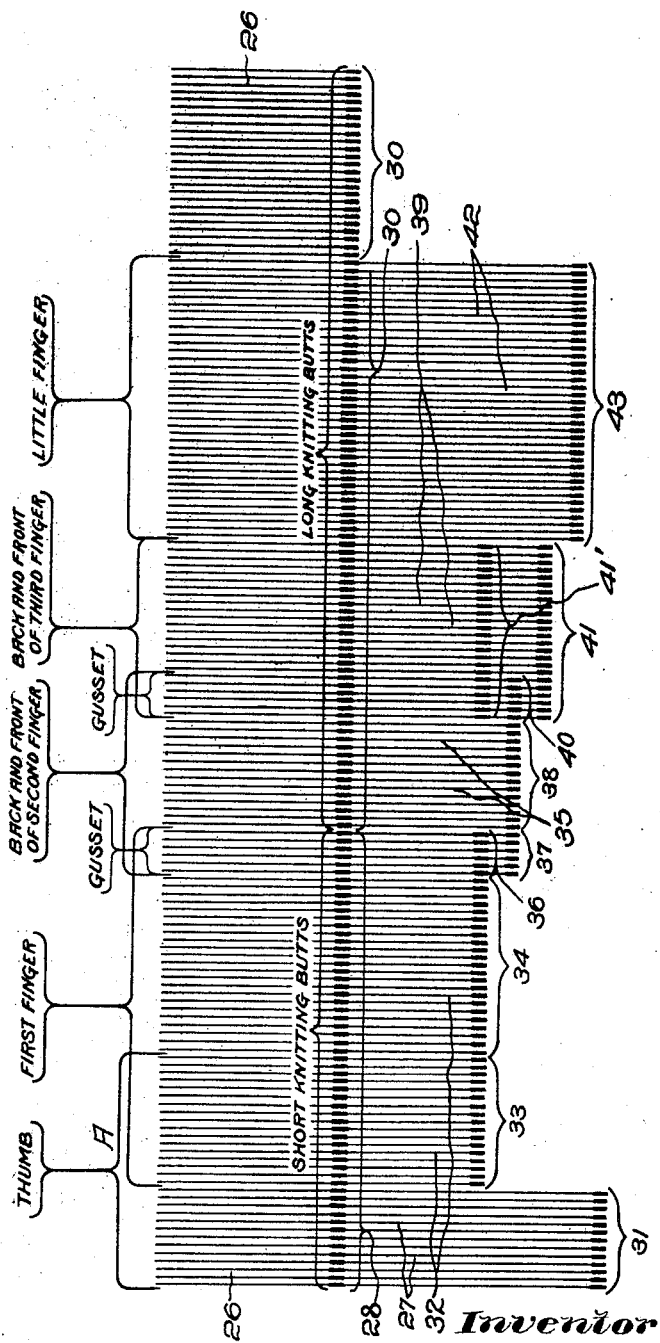

Fig. 9 is a diagram similar to Fig. 8, but indicating the length and other characteristics of the jack butts;

Fig. 10 is a development of the knitting cams and showing three sets or blocks of knitting cams characteristic of one form of my invention and also indicating the non-knitting cams by which the desired groups of needles are successively retained or brought into action;

Fig. 11 is a detail in vertical section upon the line 11—11 of Fig. 4 and indicating one of the non-knitting cams whereby the desired needles are retained or brought into action;

Fig. 12 is an end elevation of Fig. 11 with parts in section;

Fig. 13 is a detail mainly in horizontal section of the preferred form of means for operating one of the needle selecting cams;

Fig. 14 is a development indicating the needles and the length of their butts, jacks for certain of the needles and the aggroupment of said needles for forming the thumb and finger strips;

Fig. 15 is a side elevation representing one of each of the needles employed in the practice of my invention, and the jacks or extensions of such of said needles as are provided therewith;

Fig. 16 is a view similar to Fig. 3 but of a modified form of my invention wherein four sets or blocks of knitting cams are provided;

Fig. 17 is a plan view of the sets or blocks of knitting cams employed in that form of my invention represented in Fig. 16 together with a part of the operating means therefor;

Fig. 18 is a development similar to Fig. 10, but of that form of my invention employing four sets or blocks of knitting cams;

Fig. 19 is a diagram showing the lower parts of the jacks of those needles employed in knitting the thumb;

Fig. 20 is a similar diagram of the jacks for the needles for knitting the first finger;

Fig. 21 is a similar diagram of the jacks for the needles for knitting the second finger;

Fig. 22 is a similar diagram of the jacks for the needles for knitting the third finger; and Fig. 23 is a similar diagram of the jacks for the needles for knitting the fourth or little finger.

While my invention may be employed in knitting articles other than glove blanks or units, or a connected sequence of such glove blanks or units, it is preferably employed in the formation of glove blanks or units, and preferably but not necessarily the glove made in accordance with my invention has some or most of the characteristics of the glove blanks disclosed in my application Serial No. 252,965, filed Sept. 9, 1918, excepting that preferably, but not necessarily instead of knitting the entire glove blank of a single thread, certain of the thumb or finger sections are, according to the present embodiment of the invention, formed from a thread or threads other than that from which the wrist and hand are knitted.

In the mechanism disclosed in my application Serial No. 233,301, filed May 8, 1918, I employed but a single set of knitting cams. I employed a rotatable needle cylinder and stationary knitting cams, and in the formation of the thumb and finger sections or strips the needle cylinder was reciprocated.

In order that the proper needles might be acted upon by the knitting cams for the formation of each digit section or strip, means were provided for centering for the time being with reference to the knitting cams and the yarn guide, that group of needles operative in the knitting of a digit strip. This I effected by angularly shifting the needle cylinder with relation to its actuating connections.

In the disclosed embodiments of my invention, I avoid the necessity for the angular shift of the needle cylinder (or more broadly stated the relative angular shift of the needle cylinder) and provide a plurality of knitting stations at each of which I employ knitting cams of any suitable number, but herein represented in one form of my invention as three in number and in another form of my invention as four in number. Preferably, but not necessarily I provide a thread guide for and corresponding to each set of knitting cams, and during circular knitting, that is, in the formation of the wrist and hand of the glove, one only of said sets of knitting cams is in action. The thumb and fingers of the glove are formed as strips having selvaged edges and are produced by reciprocating knitting upon the appropriate needles, which to that end are divided into groups as hereinafter more fully described and constituting the thumb group and the four finger groups.

Within the scope and purpose of my invention, each of said groups of needles may be distinct from the others, but preferably certain of the needles are common to two groups. Also within the scope and purpose of my invention I may employ a knitting cam or set of knitting cams for each of said groups, which cam or set of knitting cams is distinct from those for knitting each of the other groups, but preferably and in the first form of my invention, I provide three groups of knitting cams, the first of which is employed to knit the thumb and also the first finger as well as the wrist and hand; the second of said sets of knitting cams being employed to knit the second and third fingers; and the third set of knitting cams being employed to knit the fourth or little finger. Obviously within the scope and purpose of my invention the cam employed to knit the wrist and hand may be distinct from the cams employed to knit the digits.

In the other form of my invention herein shown, I employ four sets of knitting cams, the first of which is used to knit the wrist, the hand, the thumb and the first finger; the second set being used to knit the fourth or little finger and preferably simultaneously with the knitting of the first finger; the third set being used to knit the second finger and the fourth set being used to knit the third finger.

Throughout the description I shall refer to the rotation or reciprocation of the needle cylinder, but it will be understood that within the scope and purpose of my invention, the needle cylinder may be stationary and the cam ring or cylinder may be rotated and reciprocated.

In order to knit the thumb and the fingers, certain needles that otherwise would be acted upon by the knitting cams are rendered inactive by suitable means, and preferably by elevating them, and the needle cylinder is reciprocated through a wide enough arc to cause the proper knitting cam to act upon and cause to function the proper needles for making the desired digit strip. The other digit strips are knitted upon the proper needles which are caused to function by the proper knitting cams, the other needles being rendered inactive as hereinafter described.

I have herein shown my invention as applied to that general class of circular knitting machines disclosed in the patent to Hemphill, No. 933,443, dated September 7, 1909, for improvement in circular automatic stocking knitting machines, but my invention is in no wise restricted to use in connection with that general type of machine which is merely selected for convenient illustration and which obviously is modified in important particulars to effect the knitting of a glove or like blank.

In addition to the plurality of sets of knitting cams, I provide other cams which I designate generally as the non-knitting cams, and which, in this embodiment of the invention, include the plural-group withdrawal, needle restoring, group withdrawal and group selective cams, the needles being preferably provided with special butts or heels, and in certain cases with jacks, whereby the knitting of the digit strips may be effected through the cooperation of the said cams.

The special butts or heels and the non-knitting cams constitute one form of selective devices or means which provides for the production of a selvaged thumb strip at the proper point in the tubular hand portion of a glove unit and the production of selvaged finger strips upon the end of the said hand portion. The said parts so cooperate that they selectively determine the group of needles that shall be operative to knit a given digit strip by reciprocating action; they render each group of needles inoperative to knit after the formation of its digit strip, and render a different group operative to knit other digit strips, until all of such strips will be produced in the desired succession.

Preferably, but not necessarily, I cause certain of the needles of a group employed in knitting one digit strip to be included in and made a part of a group employed in knitting the next adjoining digit strip, and also preferably but not necessarily I employ in the needle groups certain needles which I term gusset needles, so that the respective digit strips may be of the proper width.

While I shall proceed to describe in detail a certain sequence of operations, I desire it to be understood that my invention may be otherwise embodied, and that the sequence of operations may be varied and other changes made as, for example, by omission of the thumb strip and thumb opening, or the formation of digit strips upon a previously knitted hand which had been transferred from another machine, or the formation of a glove-mitten wherein a thumb and first finger strip are provided, but wherein the second, third and fourth fingers or certain of such fingers are of a mitten like construction.

In the preferred form of my invention represented by Figs. 1 to 15 inclusive, I represent mechanism operated to produce a glove unit or blank in the following sequence to which my invention is, however, not limited.

First I knit a tubular fabric to form the wrist and a part of the hand portion up to the base of the thumb. I then knit upon a certain group of needles while the others remain out of action until a selvaged flat strip has been produced of a length sufficient to form the thumb by doubling it back upon itself and uniting its opposite sides. The thumb, if knitted integrally with the hand, may, however, be formed in any suitable manner. I then knit upon all the needles and produce a circular fabric completing the hand portion of the glove unit up to the bases of the fingers. After completing the hand portion, I then knit as described more fully hereinafter upon a certain group of needles only, having retired the other needles out of action, and thereby produce by reciprocating knitting a selvaged flat strip of fabric suitable for use preferably for the first finger by doubling such strip lengthwise and seaming its side edges together and closing up the end. I then knit upon certain other needles, and preferably use a part of those employed for the first finger strip to produce by reciprocating knitting a selvaged flat strip of fabric to constitute the adjoining finger; that is, herein the second finger and of twice the length thereof, so that it can be folded transversely and seamed along its opposite edges and also across its base, either front or back. I then knit on adjoining needles and desirably with a part of those used in knitting the second finger strip to produce by reciprocating knitting a selvaged flat strip to constitute the third finger, being of twice the length thereof, so that it also can be folded transversely and seamed along its opposite edges and also across its base, front or back. I then knit upon adjoining needles to make by reciprocating knitting a selvaged flat strip of a width suitable for forming the little finger by doubling the strip lengthwise and seaming its side edges lengthwise and closing up the end.

A glove unit thus produced has the second and third fingers seamed along their opposite edges and also across their bases, either front or back. The thumb and first finger strips are seamlessly united with the main or hand portion, the thumb being seamed along its edges, and the first as well as the fourth fingers being seamed along only their inner edges. In those forms of my invention herein shown, certain of the digit strips are knitted from a thread other than the thread used in knitting the wrist and hand. My invention is, however, not limited in this respect. I desire it, however, clearly to be understood that my invention is in no wise limited to the formation of a glove of the character just specifically described, as the mechanism of my invention is adapted to making other types of gloves than that described.

Figure 1:
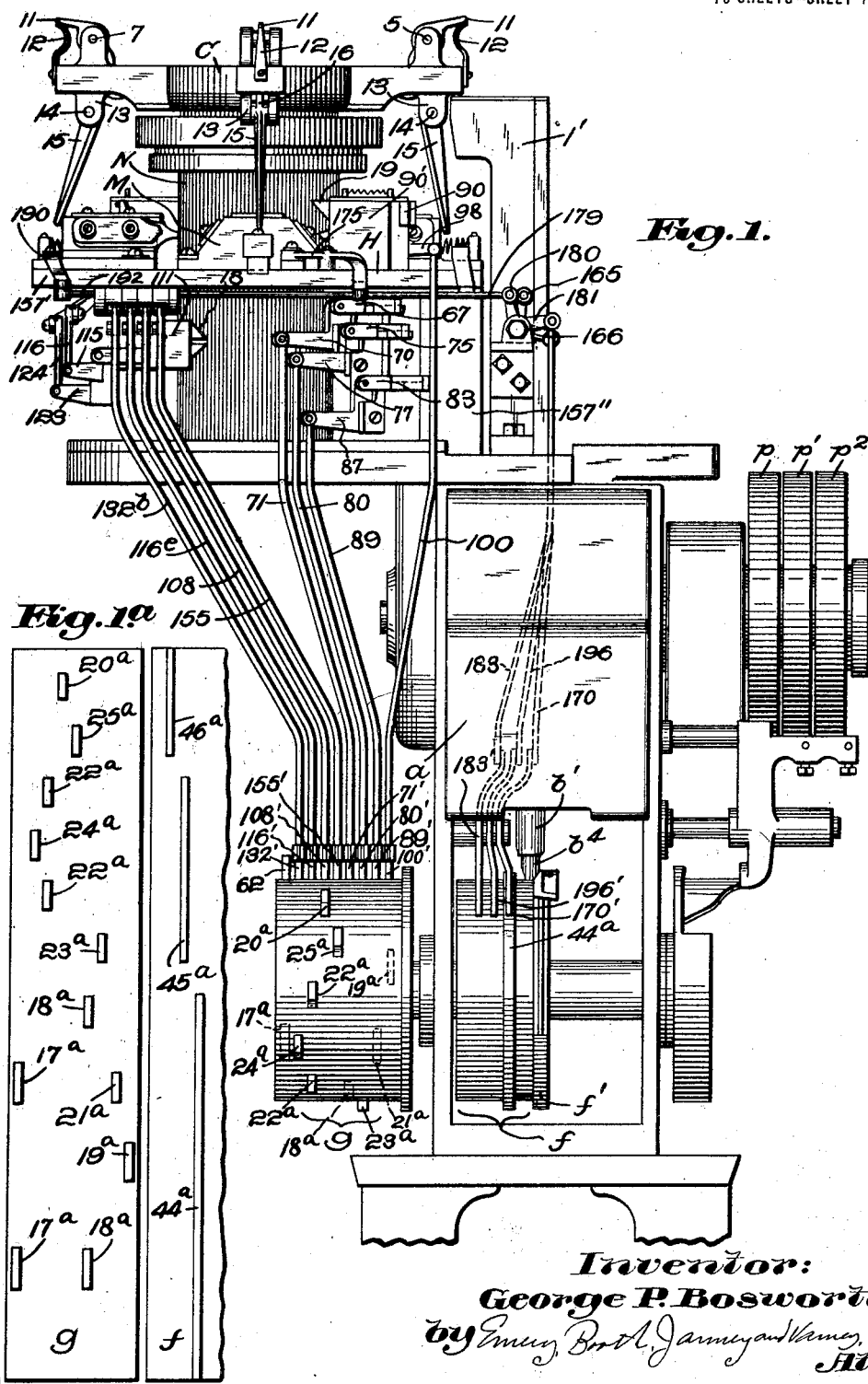
Figure 2:
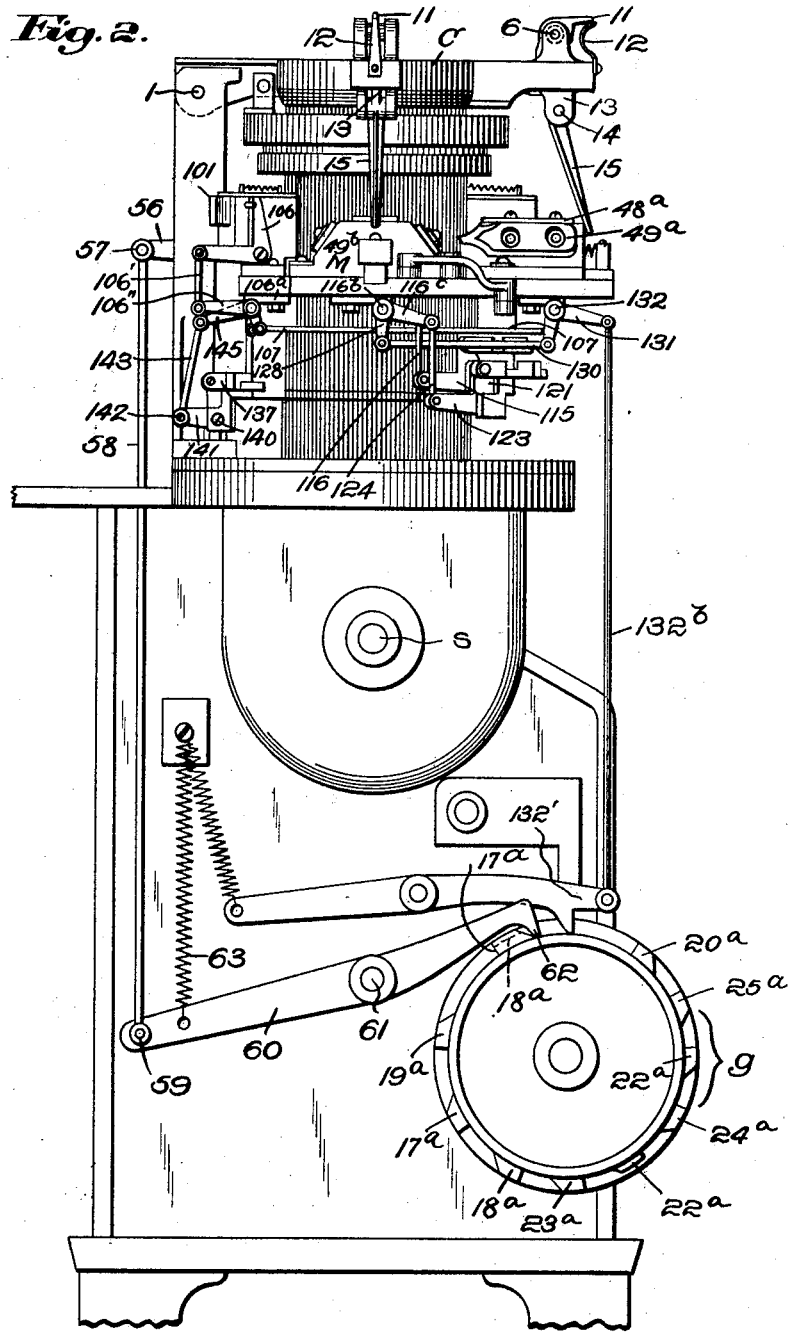
Fig. 2 is a side elevation of the mechanism illustrated in Fig. 1.

Inasmuch as certain general parts of the mechanism herein shown may be and preferably are the same as those shown in the said patent to Hemphill, No. 933,443, I have designated such parts by the same reference characters that are employed in the said patent. Thus the machine frame is marked $a$, the rotatable needle cylinder in Figs. 1 and 2 is marked N, the non-rotatable cam carrier is marked H, and the annular portion or ledge of the said cam carrier is marked M. The pulleys for the driving band are marked respectively $p$, $p'$, $p^2$ in Fig. 1 (quick speed, slow speed and loose), and at $s$, Fig. 2, is indicated the main shaft on which said pulleys are mounted. The pattern shaft is indicated in Figs. 1 and 2 at $s'$, $f$, $g$, being the pattern drums or pattern barrels upon said pattern shaft, and $f'$ is the pattern ring on the drum or barrel $f$, which engages with the member $b^4$ carried by the clutch shifting lever $b'$ for the purpose of controlling said lever, and thereby the working of the machine to produce either continuous rotation of the needle cylinder or reciprocation thereof, as required. The details of the mechanism controlled by the pattern ring $f'$, through which at times the needle cylinder is rotated continuously in a forward direction for round and round knitting, and at times is reciprocated forward and backward for flat knitting may be and preferably are the same as in said Hemphill Patent No. 933,443, and are unnecessary to be shown herein.

Although I shall describe in detail those embodiments of my invention wherein the needle cylinder rotates and reciprocates and the cam cylinder is stationary, it is obvious that the reverse mode of operation may be employed within the scope and purpose of my invention.

The latch ring C is pivoted at 1 in Figs. 2 and 3, and at the point diametrically opposite thereto is received upon the upright post or standard 1' substantially as in said Hemphill patent. Instead, however, of providing a yarn guide or set of yarn guides at one point only of said latch ring C, I preferably provide a number of yarn guides or sets of yarn guides corresponding to the number of sets of knitting cams, which in the first described embodiment of my invention is three. Therefore, as shown most clearly in Figs. 2, 5, 6, I provide three yarn guides 2, 3, 4 respectively pivoted at 5, 6, 7 in radially extending slotted portions 8, 9, 10 of said latch ring C.

Each yarn guide is provided with a member 11 outwardly extending beyond its pivot and adapted to be acted upon by a spring 12 to retain the same in its lower yarn feeding position. Since in this embodiment of my invention each of the sets or blocks of knitting cams is at times rendered inactive, I preferably provide means whereby at the same time the corresponding yarn guide is rendered inactive. For this purpose, in depending ears 13 upon the latch ring, I have pivoted at 14 levers 15 having arms 16 extending above their pivots and adapted to engage the yarn guides below their pivots 5, 6, 7. The lower end of each lever 15 is adapted to engage the corresponding knitting cam block, so that when the said cam block is rendered inactive and herein by moving it radially outward, the arm 16 of said lever is moved inward, thereby elevating the corresponding yarn guide into inactive position.

In order to select the desired groups of needles for knitting the digit strips, I may employ any suitable means, but preferably I provide the needles, or certain of them, with special butts or heels, and in some cases provide the needles with extensions or jacks having butts. With said butts, in this embodiment of my invention, I provide two plural-group needle-withdrawal cams indicated in Fig. 10 and elsewhere at 17 and 18. The said cam 17 is herein located at one side of the series of sets of knitting cams and the cam 18 is herein located below the knitting cams, and preferably between the first and second sets thereof. The needle restoring cams are indicated at 19 and 20 preferably slightly above the knitting cams or certain thereof, the cam 20 being located at the end of the series of sets of knitting cams opposite the plural-group-withdrawal-cam 17. One of the group-withdrawal cams is indicated at 21 below the sets of knitting cams, inasmuch as in this embodiment of my invention the said cam is designed to act upon the jacks of a certain group of needles, as hereinafter more fully described. The other group-withdrawal cam is indicated at 22, this cam also being located beneath the series of knitting cams, so as to act upon the jacks, or certain of the needles. The group-selective cams are indicated at 23, 24 and 25, and these cams are likewise positioned below the series of knitting cams, since they are also designed to act upon jacks of certain of the groups of needles.

I shall first refer to the construction of the needles with reference to their special butts and their jacks.

Two sets of butts are provided in connection with the needles indicated generally at 26 in Fig. 15. The butts of one set, being the upper set in the disclosed embodiment of my invention, are adapted to be engaged by the knitting cams for knitting purposes. Accordingly the butts of this set are termed herein the knitting butts, although for convenience of arrangement, the plural-group-withdrawal-cam 17 is positioned to engage with some of such butts in performing its function of rendering certain needles inactive as a preliminary step to the knitting of the digit strips, and the needle restoring cams 19, 20 are arranged to engage with such butts for the purpose of returning the inoperative needles to operative position again at the proper time. While such engagement of the cams 17, 19, 20 with the knitting butts for the said purposes is preferable, it is obvious that the needles may have other butts or forms for cooperation with such cams. The butts of the other set, the lower set in the disclosed embodiment of my invention, are adapted to be engaged only by the plural-group-withdrawal cam 18, the group-withdrawal cam 22 and also the group-selecting cams 23, 24, 25 employed in selecting the needle groups for the digit strip production. Accordingly the butts of said second set are herein termed selective butts.

The so-called knitting butts are, in the disclosed embodiment of the invention, located above the so-called selective butts to suit the illustrated relative position of the various cams, but the relative position of the two sets of butts would be reversed in case the relative arrangement of the said sets of cams were correspondingly modified.

As indicated in Fig. 15, the upper or knitting butts are formed upon short needles, and the lower or selective butts are formed upon jacks 27 detachably engaged with the short needles. If preferred, the knitting butts as well as the selective butts, may be formed upon jacks, as shown in my said copending application Serial No. 233,301, or both the knitting butts and the selective butts may be formed upon the needles themselves, as shown in said application.

As shown most clearly in Fig. 15, I provide certain needles with short butts 28 and certain of the needles with long butts 30. While any suitable arrangements may be employed, I preferably, as indicated in said figure, provide certain of the short butts needles with very long jacks 27 having a single heel 31 for engagement by the cam 21 for the purpose hereinafter described. Certain of the needles 26 having short butts 28 are provided with short jacks 32 having short heels 33, and the remainder of said needles are provided with short jacks 32 having longer heels 34. Still other of said needles 26 having short butts 28 are provided with long jacks 35 having two butts 36, 37. Certain of the needles 26 having long butts 30 are provided with jacks 35 having the single butts 38. Certain others of the needles 26 having long butts 30 are provided with jacks 39 still longer than the jacks 35 and having three butts 40, 41 and 41', the butt 41' being shorter than the others. Certain of the needles 26 having long butts 30 are provided with jacks 39 and having two butts 41 and 41'. Still other long-butt needles are provided with still longer jacks 42 having a single butt 43, and finally still other long butt needles 26 have no jacks but have long butts 30.

As stated, the needles are of two lengths of butts, short and long, and they are grouped in different series according to the length of the said butts. As shown by Fig. 8, the series of long knitting butts extends around the greater part of the needle cylinder, the remainder of the needles having short butts.

As explained more fully hereinafter, plural-group withdrawing needle cams 17, 18 select the needles on which the thumb strip is to be knitted by acting upwardly against the outer ends of the long knitting butts 30 and the long jack butts 34, 36, thereby raising the corresponding needles constituting the large proportion of the needle circle into inoperative relation. In this action the cams 17, 18 do not engage with the short knitting butts 28, and consequently the needles for such butts are permitted to remain in operation. They constitute the group upon which the thumb strip is knit and which I herein designate Group A. In performing their part of the function of selecting the needles on which the first finger strip is to be knitted, the said cam 17 acts upwardly against the outer ends of the long knitting butts 30 and raises the long butt needles into inoperative position without engaging the short knitting butts. This leaves in action only the short butt needles.

The knitting cams are arranged in a series of sets which I have indicated in Fig. 10 and elsewhere at 44, 45, 46. Each knitting cam or knitting cam group may be of any desired construction, and preferably each is composed of four cams indicated at 47 to 50, 47ᵃ to 50ᵃ, 47ᵇ to 50ᵇ. The said cams are arranged about the knitting head beneath the thread guides 2, 3, 4, as indicated in Fig. 3.

The block or set of knitting cams 44 is, in the first embodiment of my invention, employed in knitting the wrist, the thumb, the hand and the first finger; the block or set of knitting cams 45 is employed in knitting both the back and the front of the second and third fingers, and the block or set of knitting cams 46 is employed in knitting the small or fourth finger. Before describing in sequence the entire operation of knitting a glove, I will set forth the manner in which the various non-knitting cams engage needles, in order to elevate them into non-knitting position or to bring them down into knitting position. As already stated, the non-knitting cams are, in this embodiment of my invention, the cams 17 to 25 inclusive. The cam 17, herein termed a plural-group withdrawal cam, acts to elevate into non-active position the long butt needles by engaging directly with the butts 30 thereof. The plural-group withdrawing cam 18 acts, when not moved fully inward radially, to elevate into inactive position a series of needles having long jack butts 34 by directly engaging with the said butts, and also acts, when moved fully inward radially, to elevate a series of needles having short butts 33.

The cam 19 acts to throw down or restore to knitting position the long and short butt needles 30 and 28, and the cam 20 also acts to throw down all the needles after finishing each finger section. The cam 21 acts to throw into inoperative position a part of the needles used in knitting the thumb.

The cam 22 acts to throw up into inoperative position the needles used in knitting the second and third finger sections, and the cams 23, 24 and 25, which are needle selecting cams for the digit strips, act respectively to throw down into knitting operation the needles for knitting the second finger strip, the third finger strip and the fourth or little finger strip.

Briefly stated, this embodiment of my invention contains three groups of knitting cams 44, 45 46, three cams 23, 24, 25 for selecting needles for the fingers, four cams 17, 18, 21, 22 for retiring the needles from action by elevating them, and two cams 19, 20 to throw down all the needles into action at the proper time.

I will now describe in detail the construction and position of each of the non-knitting cams and means for operating the same.

The plural-group withdrawal-cam 17, shown in plan most clearly in Fig. 4 and in section 7ᶜ is mounted for vertical movement in a guide 52, and for that purpose I have herein represented the cam in Fig. 7ᶜ as having an opening 53 for engagement by the inner end 54 of a lever 54′ pivoted at 55, and to the outer end 56 whereof is pivoted at 57 a link or rod 58 also shown in Fig. 2. The lower end of said link or rod 58 is pivoted at 59 to a lever 60 pivoted at 61 upon the frame of the machine. The opposite end of said lever 60 is provided with a toe 62 which is adapted to ride upon the cam drum or barrel $g$. A spring 63 connected to the lever 60 and to a suitable part of the framing tends to hold the toe 62 in engagement with the drum or barrel $g$, and when a suitable cam 17ᵃ upon the drum or barrel comes beneath said toe, it elevates the toe 62 and pulls down the link or rod 58, thereby elevating the plural-group withdrawing cam 17 into active position.

The plural-group withdrawing cam 18 is mounted for radial movement into and out of operative position at any suitable point, and preferably between the sets of knitting cams 44 and 45 and below the level thereof. To that end, as shown most clearly in Figs. 1, 11, 12 and 13, it is provided with a radially extending stem 64, mounted in a bracket 64′, the inner end of said stem having a wedge shaped portion 65 adapted to be engaged by a correspondingly shaped wedge piece 66 upon a slide block 67, the outer end of which is pivotally connected at 68 to a bell crank lever 69, the arm 70 whereof is pivotally connected to a rod or link 71, which is indicated in Fig. 1. The said rod extends downwardly and is there connected to a lever 71′, similar to the lever 60, so as to be acted upon by a suitable cam 18ᵃ upon the drum or barrel $g$.

The group selective or needle selecting cam 23 is mounted in any suitable manner for movement into and from operative position with respect to the needles. I have herein represented it as positioned directly beneath the plural-group withdrawing cam 18. Preferably I mount the same for radial movement, and for that purpose I have in Figs. 1, 5, 7, 11 and 12 represented said cam as mounted for sliding movement in the cam ring or cylinder, and have shown the same as provided with a stem 72, the outer end of which is provided with a wedge shaped part 73 that is adapted to be engaged by a correspondingly shaped part 74 upon a slide 75 mounted for movement at right angles to the path of movement of said cam 23. The slide 75 is pivotally connected to the arm 76 of a bell crank lever 77 pivoted at 78 upon the cam ring or cylinder and having pivoted to its outer end at 79 a rod or link 80 which, as shown most clearly in Fig. 1, extends downward to the vicinity of the drum or barrel $g$ where it is pivotally connected to a lever 80′, similar to the lever 60. Such lever is controlled by a suitable cam 23ᵃ upon the barrel or drum $g$ in a manner not necessary more fully to describe.

The needle withdrawal cam 21 is mounted for movement into operative and inoperative positions in any suitable manner, but preferably I mount the same for radial movement at any suitable point, it being herein shown as positioned directly beneath the needle selecting cam 23.

Figure 5:
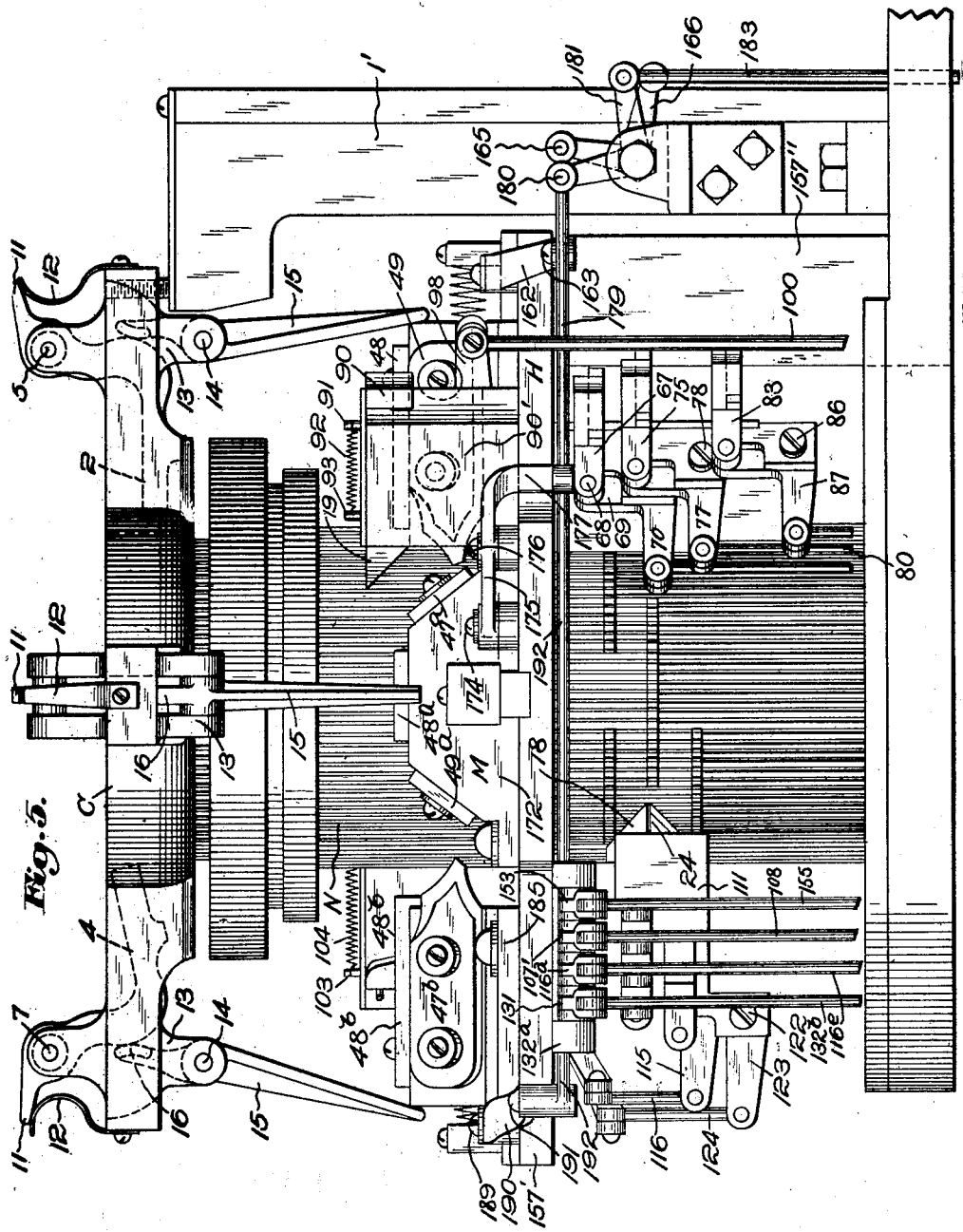
Fig. 5 is a front elevation of the upper part of the mechanism illustrated in Fig. 3.
Figure 6:
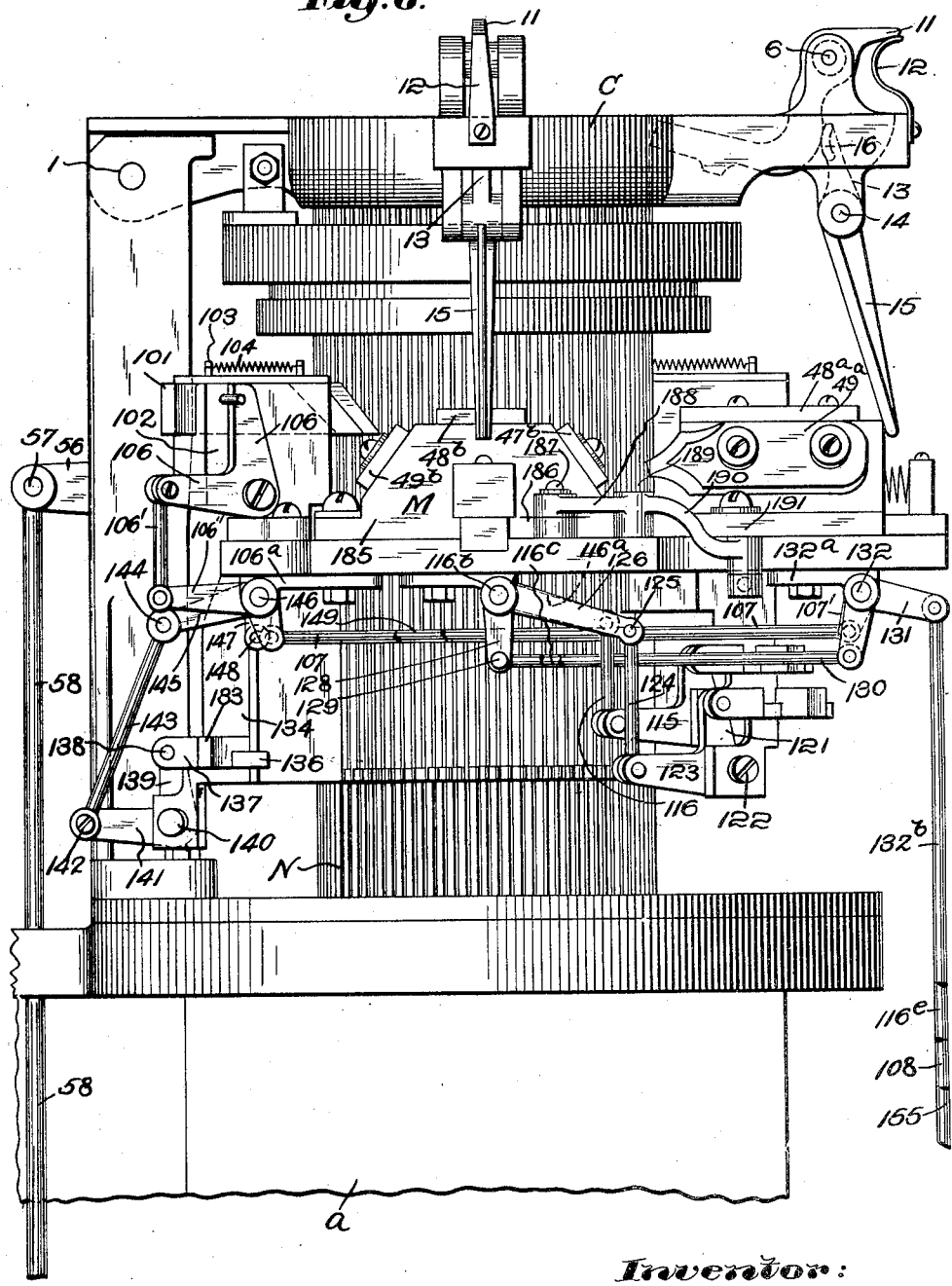
Fig. 6 is an end elevation of the upper part of the mechanism shown in Fig. 3.

Herein for the purpose and as most clearly shown in Figs. 11 and 12, and also in Figs. 1, 5 and 7, the said cam 21 is mounted for radial movement in the said bracket 64′ and is provided with a wedge shaped outer end 81, with which is adapted to engage a similarly shaped end 82 upon the slide 83 that is pivotally connected at 84 to the arm 85 of a bell crank lever pivoted at 86 and having an arm 87 that is pivotally connected at 88 to a rod or link 89 that likewise extends downward into the vicinity of the barrel or drum $g$, and where it is provided with a lever 89′ similar to the lever 60 and adapted to be acted upon by a suitable cam $21^a$ upon the periphery of said barrel or drum $g$.

The needle restoring cam 19 is mounted for movement into and from operative position in any suitable manner, it being herein shown as located directly above the plural-group withdrawal cam 18 and extending to a point above the level of the knitting cam. Preferably I effect this by mounting the cam for radial movement with respect to the needle cylinder, and for that purpose in Figs. 4, 5 and 11 I have represented said cam 19 as having a stem 90 that is mounted for sliding movement in the bracket 90′ mounted on the cam ring or cylinder. In order to impart to and fro movement to said cam 19, I have represented said stem 90 as having a pin 91 to which is connected a spiral spring 92 also connected with a pin 93 upon the frame, so that said spring tends normally to move the cam 19 into operative position with respect to the needles. Said slide 90 is also provided with a laterally extending pin 94 extending through a longitudinal slot 95 in the frame and adapted to be engaged by the arm 96 of a bell crank lever pivoted at 97 and having an arm 98 that is pivotally connected at 99 to a rod or link 100. The said rod or link 100 extends downward to the vicinity of the barrel or drum $g$ and is there suitably connected to a lever 100′ similar to the lever 60 and which is acted upon by a suitable cam $19^a$ upon said barrel or drum $g$, the latter not being herein necessary more fully to describe.

The needle restoring cam 20 is likewise mounted for movement to and from operative position. While it may be positioned at any suitable point, I have herein represented it as located at the right, viewing Fig. 10, of the entire series of knitting cams and extending to a point somewhat above the upper level thereof. As shown most clearly in Fig. 4, the said cam 20 is provided with a stem 101 mounted for radial sliding movement in a bracket 102 upon the cam ring or cylinder. The said stem 101 is provided with a pin 103 to which is connected a spring 104, the opposite end of which is connected to a pin 105 upon the bracket 102, whereby the cam is normally propelled inward by the force of the spring. The said cam is adapted to be moved outward by bell crank lever 106 connected by rod 106′ to bell crank lever 106″ which is pivotally mounted in the bracket $106^a$ on the cam ring and is connected by rod 107 to bell crank lever 107′ also carried by a bracket on the cam ring, and pivotally connected to rod 108 extending downward to lever 108′, similar to lever 60 and which is acted upon by a suitable cam $20^a$ upon the barrel or drum $g$.

The group withdrawal cam 22 is also mounted for movement into and from operative position in any suitable way. I have herein represented it as mounted between the sets of knitting cams 45, 46 and below the level thereof. While it may be moved into and from operative position in any suitable manner, I have as most clearly shown in Figs. 4 and 7, represented the said cam 22 as having a stem 110 mounted for sliding movement in a guide 111. The outer end of said slide 110 is provided with a wedge 112 that is adapted to be engaged by a similarly shaped part 113 upon the slide 114 that is pivotally connected to the arm 115 of a bell crank lever whose opposite end is pivotally connected to a rod or link 116 that extends upward and is pivotally connected to a bell crank $116^a$ pivoted at $116^b$ on the cam ring or cylinder. Connected to said bell crank $116^a$ is a link or rod $116^c$ that is connected to a bell crank $116^d$ mounted upon the cam ring or cylinder and to which is connected a link or rod $116^e$ extending downward and pivotally connected to a lever 116′ similar to the lever 60 and controlled by a suitable cam $22^a$ upon the barrel or drum $g$.

The needle selecting or group selective cam 24 is also mounted for movement into and from operative position, it being located at any suitable point, but herein directly beneath the needle or group withdrawal cam 22. I have herein shown the cam as mounted for radial movement, and in Figs. 6, 7 and $7^a$, I have represented it as provided with a stem 117 mounted in a suitable guide 111 and having a wedge shaped outer end 118 adapted to be engaged by a similarly shaped end 119 upon a slide 120 that is pivotally connected to an arm 121 of a bell crank lever pivoted at 122 and having an arm 123 connected to a rod or link 124, the upper end whereof is pivotally connected at 125 to an arm 126 of a second bell crank lever pivoted at $116^f$ and having a second arm 128, which is connected at 129 to a horizontal rod 130 connected to a bell crank 131 (see Fig. 7) pivoted at 132 upon a suitable bracket $132^a$. To said bell crank 131 is connected a downwardly extending rod $132^b$ (Figs. 1, 4 and 6), which at its lower end is connected to a lever 132′ similar to the lever 60 and which extends into the path of a suitable cam $24^a$ upon the drum or barrel $g$.

The needle selecting or group selective cam 25 is also mounted for movement into and out of operative position, it being located at any suitable point, but herein directly beneath the restoring cam 20 and at a suitable distance therebelow. As shown most clearly in Figs. 6, 7 and $7^b$, the said cam 25 is provided with a stem 133 mounted in a suitable guide 134 for sliding radial movement and having at its outer end a wedge 135 adapted to be engaged by a similarly shaped wedge 136 upon a slide 137 that is pivotally connected at 138 to the upper arm 139 of a bell crank lever pivoted at 140 and having a second arm 141 to which is pivoted at its outer end 142 a link or rod 143, to which at its opposite end 144 is pivoted an arm 145 of a longer bell crank lever which is pivoted at 146 and has a second arm 147 to which is pivotally connected at 148 a horizontally extending link or rod 149, to the outer end whereof is pivoted at 150 the arm 151 of a third bell crank lever. Said bell crank lever is suitably pivoted at 152 and is provided with a second arm 153 to which is pivotally connected at 154 the upper end of a vertically extending link or rod 155 that extends down into the vicinity of the barrel or drum $g$, and where it is connected with a lever 155' similar to the lever 60 which extends into the vicinity of said barrel or drum $g$, so as to be engaged and acted upon by a suitable cam 25ᵃ upon said barrel or drum in a manner not herein necessary more fully to describe.

As already stated, I have in the first illustrated embodiment of my invention shown three sets of knitting cams 44, 45, 46, the first of said sets of cam being used in knitting the wrist, the thumb, the hand and the back and front of the first finger, the second of said sets of cams being used in knitting the back and front of the second and third fingers and the third of said sets of cams being used in knitting the fourth or little finger. Viewing the diagram in Fig. 8, it will be evident that the first set or block 44 of said knitting cams is located in the vicinity of the needles that are employed in knitting the thumb and first finger, the second block or set 45 is located in the vicinity of the needles used for knitting the second and third fingers, and the third block or set 46 of the knitting cams is located in the vicinity of the needles used in knitting the fourth or little finger, assuming the machine to be at rest following the completion of the hand of the glove.

Inasmuch, therefore, as the said sets or blocks of knitting cams 44, 45, and 46 so employed to act upon different needles are employed one after another in the production of different parts of the glove, it is important, in the disclosed embodiment of my invention, that said cams or parts thereof be mounted for movement to and from operative position, so that they may be withdrawn from operative relation to the needles at the proper time. To this end, the said sets or blocks of knitting cams or parts thereof may be moved in any suitable manner, but preferably I impart radial movement thereto. I will describe in turn the illustrated construction for operating each of these cams or parts thereof.

As shown most clearly in Figs. 1, 3, 4 and 5, the set of knitting cams 44 is mounted upon a block 156 for radial movement upon surface 157 of the plate 157' secured to the top of an upright post 157" extending upward from the frame of the machine. To an ear 158 extending from the rear of the block 156 is pivotally connected at 159 the arm 160 of a lever pivoted at 161 and having an arm 162 pivoted at 163 to a link 164, the other end of which is itself pivotally connected at 165 to the arm 166 of a bell crank lever pivoted at 167 and having an arm 168 to which is pivotally connected at 169 a rod 170, extending vertically downward into the vicinity of the barrel or drum $f$ where it is connected to a lever 170' (Fig. 1) similar to the lever 60, and which itself is acted upon by a suitable cam 44' upon said barrel or drum, thereby to effect the movement of said block 156 radially outward into inactive position, against the stress of the spring 171 which restores the said block 156 to operative position at the proper time.

The set of knitting cams 45 is mounted upon a block 172 also positioned for radial movement upon the surface 157 of said plate 157' and having a rearwardly extending ear 173 to which is pivotally connected at 174 the arm 175 of a lever pivoted at 176 and having a second arm 177 pivoted at 178 to a horizontally extending link or rod 179. To the outer end of said link or rod 179 is pivoted at 180 the arm 181 of a bell crank lever pivoted at 167 and to the second arm 182 whereof is connected the upper end of a link or rod 183. The said link or rod 183 extends downward to the vicinity of the barrel or drum $f$ where is suitably connected to a lever 183' (Fig. 1) similar to the lever 60, and which is adapted to be acted upon by a suitable cam 45ᵃ upon said barrel or drum so as at the proper time to move the said cam block 172 radially outward against the stress of the spring 184, which at the proper time restores the block to operative position.

The third set of knitting cams 46 is mounted upon a block 185 positioned for sliding movement upon the said surface 157 of the said plate 157'. From the rear of said block extends an ear 186 to which is pivotally connected at 187 an arm 188 of a lever pivoted at 189 and having a second arm 190 to which is pivotally connected at 191 a horizontal link or rod 192 that extends into proximity to the links 164 and 179, and where it is pivotally connected at 193 to the arm 194 of a bell crank lever pivoted at 167 and whose second arm 195 is pivotally connected to a link or rod 196 that also extends vertically downward into the vicinity of the barrel or drum $f$, where it has pivotally connected thereto a suitable lever 196' (Fig. 1) preferably similar to the lever 60 and which is adapted to be acted upon by a suitable cam 46ᵃ upon said barrel or drum, whereby at the proper time the said block 185 is moved radially outward into inactive position against the stress of the spring 197, which at the proper time restores the said cam block 185 to operative position.

I have referred to the various cams as moved radially inward. It will be understood that the cams are suitably moved inward until the movement thereof is arrested through contact of the inner face of each cam with the outer ends of certain of the knitting butts, or with the periphery of the needle cylinder, or by means of some other positive stop utilized for the purpose, as the case may be, and which it is not necessary more fully to disclose.

Having now described the general structure of the parts, I will now describe one cycle of operation in the knitting of a glove and commencing with the wrist.

At the commencement of the knitting of the wrist of the glove, all the needles are down and in action and the cam block 156 carrying the set of knitting cams 44 is in action, having been moved radially inward, thus causing the corresponding thread guide 2 to be positioned in yarn feeding relation. The cam blocks carrying the set of knitting cams 45, 46 are in their outer or inoperative position, and their yarn guides 3, 4 have been elevated into inactive or nonfeeding position. The cam 20 is in action, having just returned all the inactive needles to action, but all the remaining cams are out of action, namely, the needle or group withdrawing cam 21, the needle or group restoring cams 19, and the needle selecting or group selective cams 23, 24, 25.

Rotary knitting now proceeds upon all the needles. Rotary knitting continues until the base of the thumb is reached. Thereupon the plural-group withdrawal-cam 17 is lifted into operative position, and all the long butt needles are thrown up out of action thereby through engagement by said cam of the butts 30 of said needles. The plural-group withdrawal-cam 18 is now moved radially inward part of its full radial movement, under influence of the spring controlled lever 71', into operative position, and it engages the butts 34 of the jacks 32 and moves the corresponding needles out of action. This leaves in action only a part of the short butt needles, about thirty in number as indicated in the diagram, Fig. 8. It will be understood that any suitable number of needles may be provided for the thumb, and for all the other digit strips.

By means not herein necessary to describe, but preferably the same as that shown in the Hemphill Patent, No. 933,443, the motion of the needle cylinder is now changed from rotary to reciprocating, and the selvaged thumb strip is knitted by reciprocating knitting upon the said short butt needles. This strip is of twice the length of the thumb, so that it can be folded back upon itself and united at its opposite edges.

Having knitted the thumb strip, it is now necessary to restore all the needles to action and to change to rotary knitting. To this end, all the long butt needles and those short butt needles that were previously rendered inactive are restored to action by the needle restoring cam 19, which acts upon needle butts of the said needles and brings them down into the zone of action of the set of knitting cams 44. The movement of the needle cylinder is now changed to a rotary one, and the hand is knitted upon all the needles.

According to the preferred manner of operation, the first finger strip is next knitted. Preliminary thereto, the movement of the needle cylinder is changed from a rotary to a reciprocating one, and all the long butt needles are drawn up out of action by engagement of the needle butts thereof by the plural-group-withdrawing cam 17. Viewing the diagram, Fig. 8, it will be observed that the first finger is knitted upon a portion of the short butt needles. It is therefore necessary before commencing the first finger strip to throw up out of action the other portion of the short butt needles. For this purpose, the needle withdrawing or group withdrawal cam 21 is moved radially inward and rendered active and engages with the butts 31 of the needle jacks 27 of such short butt needles. This leaves in action merely a portion of the short butt needles. Thereupon reciprocating knitting takes place upon said needles and a selvaged finger strip of the length of the finger is knitted. The finger is subsequently completed by seaming the selvaged edges together along the inside of the finger.

The knitting of the first finger strip having been completed, the set of knitting cams 44 is moved radially outward and rendered inactive, and at the same time the corresponding thread guide is elevated into inactive position. It now becomes necessary to throw up out of action all the needles which were used in knitting the first finger strip. For that purpose the plural-group-withdrawing cam 18 is moved radially inward to its full extent and it engages the jack butts 33, 34 of the short butt needles and the jack butts 36 of those short butt needles provided therewith, and thus removed from action all the needles that were employed in knitting the first finger.

The set of knitting cams 45 is now moved radially inward and the corresponding thread guide 3 moves inward into operative position. The thread thereof is introduced beneath the latches of the needles in any suitable manner, either by hand or otherwise in a manner corresponding to the introduction of a splicing thread.

The next step in the operation is to bring into action the needles for knitting the double length strip which is to be folded upon itself to form the second finger and eventually seamed to the top of the palm of the hand.

For this purpose, the cam 23 is moved radially inward and it engages with the butts 37, 38 upon the jacks 35 that are upon certain of the short butt needles. These needles having been thrown down into action, the second set of knitting cams 45 acts thereon, and the motion of the needle cylinder is changed from rotary to reciprocating, thereby to make a flat selvaged strip of twice the length of the second finger. While any suitable number of needles may be employed in knitting the strip constituting the back and front of the second finger, I have in diagram (Fig. 8) represented twenty-six needles as so employed, and certain of these needles are introduced for the purpose of forming the gusset at the edge of the strip, so that it may be of the desired width. Said gusset needles are the short butt needles having the double jack butts 36, 37.

Having knitted a flat selvaged strip of sufficient length to constitute the back and front of the second finger, it next becomes necessary to knit in a similar manner a strip for the third finger and preliminarily thereto it is necessay to throw up out of action all the needles that were used in knitting the back and front of the second finger. To this end, the cam 22 is now moved radially inward, but not to its full extent, being restrained from a full radial movement inward because of the conformation of the cams on the drum $g$, it being noted that the controlling cams upon drum $g$, for the non-knitting cams 18 and 22, are each made in two heights. When so moved inward the cam 22 engages with the butts 37, 38 upon the jacks of those needles used in knitting the second finger and moves said needles up out of action. It will be understood that each non-knitting cam after being brought into action and serving this general purpose is retired from action. Therefore the cam 22 is now retired from action. The cam 24 is now moved radially inward into action, and it engages with the jack butts 41 of certain of the long butt needles and throws them down into action. Having functioned in this manner, the cam 24 is now retired from action by being moved radially outward. Knitting now proceeds upon all said needles until a flat selvaged strip of sufficient length is knitted to constitute both the back and the front of the third finger, so that such strip may be folded crosswise upon itself at the tip of the finger and then seamed at the top of the palm to the hand portion of the glove. While any suitable number of needles may be employed in knitting the third finger, I have in the diagram (Fig. 8) represented twenty-four needles. These include certain of the needles that were used in knitting the second finger just as certain of the needles used in knitting the second finger were employed in knitting the first finger.

Included among the needles employed to knit the third finger are certain long butt needles having double butts 40, 41 upon their jacks. These are the needles which constitute the gusset needles for the third finger.

It next becomes necessary to throw up out of action all the needles that were used in knitting the third finger. For that purpose the cam 22 is now moved radially inward to its full extent, and it engages the jack butts 41, 41' of the needles used in knitting the third finger and throws them up out of action. The cam 22 having thus functioned to render inactive the needles employed in knitting the third finger, it is retired from action.

The second set of knitting cams 45 is now rendered inactive by being moved radially outward, carrying with it the thread guide 3, and the third set of knitting cams 46 is moved radially inward into action, bringing into action with it the thread guide 4 pertaining thereto.

It now becomes necessary to bring into action the needles for knitting the fourth or little finger. For this purpose the cam 25 is moved inward into operative position and it engages the jack butts 43 of those long butt needles provided therewith and moves the said needles down into action. Having functioned in this manner, the said cam 25 is moved radially outward into inoperative position.

The thread fed through the thread guide 4 is now suitably introduced to the needles that have been rendered operative to knit the little finger and knitting proceeds until a flat selvaged strip of sufficient length is knitted to constitute the back and front of the little finger, the selvaged edges being afterward seamed together along the inside of the little finger. While any suitable number of needles may be employed for this purpose, I have in the diagram (Fig. 8) indicated thirty-eight needles as employed in knitting the little finger. Preferably but not necessarily, none of the needles used in knitting the little finger is used in knitting any of the other digit strips.

The third cam block 46 is now moved out of action carrying with it its thread guide 4, and the first cam block 44 is moved into action bringing with it its thread guide 2. At this point the only needles in operation are those employed in knitting the little finger. It now becomes necessary to throw into action all the remaining needles preparatory to commencing the knitting of the wrist of the next glove. To that end, the needle restoring cam 20 is now moved radially inward into action and it engages with the knitting butts of all the inactive needles and throws them down into action. All the needles are now in action and the motion of the needle cylinder is changed from a reciprocating one to a rotary one, and the knitting of the wrist of the next glove proceeds.

Upon completion of a glove unit and its removal from the machine, the widening or gusset of a given finger strip is cut across at the junction of its base portion with the tip portion of the adjoining strip.

I have thus described in detail the preferred form of my invention, wherein three sets of knitting cams are employed. My invention is not limited to the use of any particular number of sets of knitting cams, and two, three, four or five may be employed as seems suitable.

In another form of my invention next to be described, namely, that shown in Figs. 16, 17, 18, I have represented a modified form of mechanism wherein four sets of knitting cams are employed.

In that form of my invention shown in Figs. 16, 17, 18, I employ four sets of knitting cams 44', 45', 46' and 198.

The sets of cams 44', 45', 46' preferably correspond in construction and arrangement with the sets of cams 44, 45, 46 heretofore described, and are respectively made up of the cams 47', 48', 49', 50', 47a', 48a', 49a', 50a', and 47b', 48b', 49b', 50b'. The set of cams 198 is preferably composed of the cams 199, 200, 201, 202, which are similar in construction and arrangement to the cams of the other sets.

While the said sets of cams may be employed to knit any desired portions of the glove, I preferably employ the set of cams 44' to knit the wrist, thumb and hand and first finger, the said cams 45' to knit the second finger, the set of cams 46' to knit the little finger and the set of cams 198 to knit the third finger. While the said cams may be arranged in any desired sequence, I preferably arrange them in the order shown and as indicated in Figs. 16 and 17, so that the set of cams 44' and 46' are substantially opposite and so that sets of cams 45' and 198 are substantially opposite. Preferably also the parts are so operated that the set of cams 44', 46' are in operation at the same time, so that they simultaneously form their digit strips, and the set of cams 45' and 198 are in operation at the same time but at a period other than the period of operation of the cams 44', 46'. Thus in this form of my invention, the first finger and little finger are formed at the same time and the second finger and the third finger are formed at the same time. Obviously, however, the several finger strips may be formed at different times.

In this form of my invention I employ plural group withdrawal cams 17', 18', which are preferably essentially the same as the cams 17, 18 heretofore described; I also employ needle restoring cams 19', 20' which are essentially the same as the needle restoring cams 19, 20, heretofore described; I also employ group withdrawal cams 21', 22' which in structure are essentially the same as the group withdrawal cams 21, 22 previously described, but preferably the cam 21' is placed a little lower than in that form of my invention shown in Fig. 10, and the cam 22' is placed directly over the cam 25' which corresponds in function and position to the cam 25 in that form of my invention shown in Fig. 10. I also employ cams 20', 24', 25' which substantially correspond to the cams 23, 24, 25 shown in Fig. 10, it being noted that the cams 24', 25' are employed as group selective cams for the third finger.

Preferably I employ the two selective cams 24', 25' both acting to select needles for the third finger, so as more readily to draw down from inactive position all the needles necessary therefor. My invention, however, is not limited to the use of a plurality of selective cams for the third or for any other finger.

In addition to the said cams, I provide a cam 203 shown in Fig. 18 as directly under needle restoring cam 20'. The said cam 203 acts as a group selective cam for the little finger and acts upon the jack butts so as to bring down into action the necessary needles.

Referring to Figs. 16 and 17, it will be noted that I preferably employ a latch ring C' similar to the latch ring C, shown in the first form of my invention and employ thread guides 2', 3', 4' corresponding to the thread guides 2, 3, 4 shown in the first form of my inventiton and cooperating with the corresponding sets of cams. In addition I employ a fourth thread guide 204 cooperating with the fourth set of cams 198 and corresponding in structure and mode of operation with the other thread guides.

In order to operate the various sets of knitting cams I provide any suitable means and preferably means similar to those already described. To that end in Figs. 16 and 17, I have represented the set of cams 44' as mounted upon a block having a rearwardly extending ear 205, to which is connected one arm 206 of a bell crank lever pivoted at 207 and having a second arm 208 pivotally connected to a link 209 which at its other end is pivotally connected to an arm 210 of a bell crank lever itself pivoted at 210' and having another arm 211 connected to a link 212 extending downward toward the pattern drum and operated in a manner fully described in connection with the preceding form of my invention and not necessary herein more fully to disclose. Similarly the block for the set of cams 45 is provided with a rearwardly extending ear 213, to which is pivotally connected an arm 214 of a bell crank lever pivoted at 215 and having a second arm 216 to which is pivotally connected a link 217 itself pivotally connected to arm 218 of a bell crank lever pivoted upon a stud 219 and having an arm 220 connected to a link 221 extending downward so as to be operated by a proper cam upon the pattern drum in a manner not herein necessary more fully to describe. The cam block for the set of cams 46 is provided with a rearwardly extending ear 222 pivotally connected to a lever 223 pivoted at 224. Also mounted upon the same pivot is a lever 225 to which is pivotally connected a link 226 pivotally connected at its other end to a lever 227 pivoted at 215. Also pivotally connected to the free end of the lever 227 is a link 228 pivotally connected to an arm 229 of a bell crank lever pivoted at 219 and having a second arm 230 which is pivotally connected to a link 231 extending downward toward the pattern drum so as to be operated in a manner already described with reference to other cams.

The block for the set of cams 198 is provided with a rearwardly extending lug 232 to which is pivotally connected a lever 233 pivoted upon the stud 234. Also pivoted upon the stud 234 is a link 235 to which is pivotally connected a link 236, the opposite end of which is pivotally connected to a lever 237 that is itself pivoted at 207. Also pivotally connected to the free end of the lever 237 is a link 238 whose opposite end is pivotally connected to an arm 239 of a bell crank lever pivoted upon the stud 210'. The other arm 240 of said bell crank lever is pivoted to a link 241 that extends downward toward the pattern drum and is operated by a suitable cam thereon in a manner similar to that already described.

The other or non-knitting cams employed in this form of my invention are operated preferably in the same way as those described in connection with the first form of my invention, it being noted that the cam 203 is operated by moving the same radially in a manner similar to that described with respect to other cams.

Having thus described one illustrative embodiment of my invention, I desire it to be understood that although specific terms are employed, they are used in a generic and descriptive sense and not for purposes of limitation, the scope of the invention being set forth in the following claims:

1. A knitting machine having in combination a circular series of needles and a carrier therefor; a plurality of knitting cams, means to knit on said needles by one of said knitting cams tubular fabric to constitute the wrist and lower portion of the hand of a glove; means to knit on a group of said needles a selvaged thumb strip formed with said tubular fabric, means for resuming and completing the tubular fabric for the balance of the hand and means for knitting a plurality of selvaged digit strips as actual continuations of the tubular fabric and upon the respective knitting cams.

2. A knitting machine having a circular series of needles and a carrier therefor, a plurality of knitting cams, means to knit on said needles by one of said knitting cams tubular fabric; means to knit on a group of said needles a selvaged strip formed with said tubular fabric, means for resuming the formation of tubular fabric upon said series of needles and means for knitting in succession a plurality of selvaged strips as actual continuations of the said tubular fabric and upon the respective knitting cams.

3. A knitting machine having a circular series of needles and a carrier therefor, a plurality of knitting cams, means to knit tubular fabric on said needles by one of said knitting cams and means for knitting in succession a plurality of selvaged strips as actual continuations of said tubular fabric and upon the respective knitting cams.

4. A knitting machine for the production of tubular work having a plurality of selvaged strips formed integral with the tubular work, comprising a circular series of needles and a carrier therefor, a plurality of knitting stations, selective means to render said needles divisible into groups for reciprocating work; non-knitting cams cooperating with said selective means in effecting the segregation for each strip in succession, of the corresponding strip-group for the beginning of the strip, the other needles remaining inoperative to knit until the completion of the strip and the restoration of the strip-group upon each completion,; means relatively to rotate said needle carrier for effecting tubular work and means relatively to reciprocate said needle carrier for the production of said selvaged strips.

5. A knitting machine having a circular series of needles and a carrier therefor; a plurality of knitting cams, selective means for rendering said needles divisible into groups for reciprocating work, non-knitting cams cooperating with said selective means to complete the segregation of said groups and the restoration thereof, means relatively to rotate said needle carrier for effecting tubular work and means relatively to reciprocate said needle carrier through wide enough arcs to cause the production in succession on said knitting cams respectively of a plurality of selvaged strips formed with the tubular work.

6. A knitting machine having a circular series of needles and a carrier therefor, a plurality of knitting cams, selective means to render said needles divisible into groups for reciprocating work, said groups corresponding to said plurality of knitting cams, non-knitting cams cooperating with said selective means to complete the segregation of said groups and the restoration thereof, means relatively to rotate said needle carriers for effecting tubular work and means relatively to reciprocate said needle carriers for the production in succession of a plurality of selvaged strips formed with the said tubular work.

7. A knitting machine having a circular series of needles and a carrier therefor, a plurality of knitting stations, selective means to render said needles divisible into groups for reciprocating work, non-knitting cams cooperating with said selective means to complete the segregation of said groups and the restoration thereof, said non-knitting cams including a plural-needle group withdrawal cam or cams.

8. A knitting machine having a circular series of needles and a carrier therefor, a plurality of knitting stations, selective means for rendering said needles divisible into groups for reciprocating work, non-knitting cams cooperating with said selective means to complete the segregation of said groups and the restoration thereof, means relatively to rotate said needle carrier for effecting tubular work; and means relatively to reciprocate said needle carrier for the production of a plurality of selvaged strips formed with the tubular work, said means including plural-needle-group-withdrawal cams and needle restoring cams.

9. A knitting machine having a circular series of needles and a carrier therefor; a plurality of knitting stations, selective means to render said needles divisible into groups for reciprocating work, non-knitting cams cooperating with said selective means to complete the segregation of said groups and the restoration thereof, means relatively to rotate said needle carrier for effecting tubular work and means relatively to reciprocate said needle carrier for the production in succession of a plurality of selvaged strips formed with the tubular work and including one or more group-withdrawal cams.

10. A knitting machine having a circular series of needles and a carrier therefor, a plurality of knitting stations, means to render selectively said needles divisible into groups for reciprocating work, non-knitting cams cooperating with said selective means to complete the segregation of said groups and the restoration thereof, means relatively to rotate said needle carrier for effecting tubular work and means relatively to reciprocate said needle carrier for the production of a plurality of selvaged strips formed with the tubular work and including plural group-withdrawal cams, single group-withdrawal cams and needle restoring cams.

11. A knitting machine having a circular series of needles and a carrier therefor, a plurality of needle cams; means to render each of said knitting cams periodically inactive, means to knit on said needles by one of said knitting cams tubular fabric to constitute the wrist and lower portion of the hand of a glove; means to knit on a group of said needles a selvaged thumb strip formed with said tubular fabric, means for resuming and completing said tubular fabric for the balance of the hand, and means for knitting a plurality of selvaged digit strips as actual continuations of the tubular fabric and upon the respective knitting cams.

12. A knitting machine having a circular series of needles and a carrier therefor, a plurality of knitting cams, means to render each of said knitting cams periodically inactive, means to knit tubular fabric on said needles by one of said knitting cams, means to knit on a group of said needles, a selvaged strip formed with said tubular fabric, means for resuming the formation of tubular fabric upon said series of needles, and means for knitting a plurality of selvaged strips as actual continuations of said tubular fabric and upon the respective knitting cams.

13. A knitting machine having a circular series of needles and a carrier therefor, a plurality of knitting cams, means to render each of said knitting cams periodically inactive, means to knit tubular fabric on said needles by one of said knitting cams and means for knitting a plurality of selvaged strips as actual continuations of said tubular fabric and upon a corresponding number of said knitting cams or sets thereof.

14. A knitting machine having a circular series of needles and a carrier therefor, a plurality of knitting cams, means to move said knitting cams radially, periodically, so as to render them inactive; means to knit tubular fabric on said needles by one of said knitting cams and means for knitting a plurality of selvaged strips as actual continuations of said tubular fabric and upon the respective knitting cams.

15. A knitting machine having in combination a circular series of needles and a carrier therefor, a plurality of knitting cams, a thread guide for each knitting cam or set thereof and pertaining only thereto, means to knit on said needles by one of said knitting cams tubular fabric to constitute the wrist and lower portion of the hand of a glove, means to knit on a group of said needles a selvaged thumb strip formed with said tubular fabric, means for resuming and completing the tubular fabric for the balance of the hand, and means for knitting a plurality of selvaged digit strips as actual continuations of a tubular fabric and upon the respective knitting cams.

16. A knitting machine having a circular series of needles and a carrier therefor, a plurality of knitting cams, a thread guide for each knitting cam and pertaining only thereto, means to knit on said needles tubular fabric by one of said knitting cams; means to knit on a group of said needles a selvaged strip formed with said tubular fabric, means for resuming the formation of tubular fabric upon said series of needles and means for knitting in succession a plurality of selvaged strips as actual continuations of said tubular fabric and upon the respective knitting cams.

17. A knitting machine having a circular series of needles and a carrier therefor, a plurality of knitting cams, a thread guide for each knitting cam and pertaining only thereto, means to knit tubular fabric on said needles by one of said knitting cams and means for knitting in succession a plurality of selvaged strips as actual continuations of said tubular fabric and upon the respective knitting cams.

18. A knitting machine having a circular series of needles and a carrier therefor, a plurality of knitting cams, a thread guide for each knitting cam and pertaining only thereto; means for rendering each of said knitting cams and its thread guide periodically inactive; means to knit tubular fabric on said needles by one of said knitting cams and means for knitting a plurality of selvaged strips as actual continuations of said tubular fabric and upon the respective knitting cams.

19. A knitting machine having a circular series of needles and a carrier therefor, a plurality of knitting cams, a thread guide for each knitting cam and pertaining only thereto, means to move radially each of said knitting cams and to move its thread guide so as to render the same inactive, means to knit tubular fabric on said needles by one of said knitting cams and means for knitting a plurality of selvaged strips as actual continuations of the tubular fabric and upon the respective knitting cams.

20. A knitting machine having a circular series of needles and a carrier therefor, at least three sets of knitting cams, means to knit tubular fabric on said needles by one of said knitting cams and means for knitting a plurality of selvaged strips as actual continuations of said tubular fabric and upon the respective knitting cams, said means including a plurality of cams for selecting needles for the finger strips, a plurality of cams for retiring needles from action and a plurality of cams to restore needles to action.

21. A knitting machine having a circular series of needles and a carrier therefor, three sets of knitting cams, means to knit tubular fabric on said needles by one of said knitting cams and means for knitting a plurality of selvaged strips as actual continuations of said tubular fabric and upon the respective knitting cams, said latter means having associated therewith three cams for selecting needles for the finger strips, four cams for retiring needles from action and two cams for restoring needles to action.

22. A knitting machine having a circular series of needles and a carrier therefor, at least three sets of knitting cams, means to knit tubular fabric on said needles by one of said knitting cams and means for knitting a plurality of selvaged strips as actual continuations of said tubular fabric and upon the respective knitting cams, said latter means having associated therewith a plurality of cams for selecting needles for the finger strips, a plurality of cams to restore needles to action and means to render each of said cams periodically active and then inactive upon the needles.

23. A knitting machine having a circular series of needles and a carrier therefor, a plurality of knitting cams, a thread guide for each knitting cam and pertaining only thereto, means to maintain a fixed relation between each thread guide and its cam, means to knit tubular fabric on said needles by one of said knitting cams, and means for knitting in succession a plurality of selvaged strips as actual continuations of said tubular fabric and upon the respective knitting cams.

24. A knitting machine having a circular series of needles and a carrier therefor, a plurality of knitting cams, means to knit tubular fabric on said needles by one of said knitting cams, and means for knitting a plurality of selvaged strips as integral continuation of said tubular fabric and upon the respective knitting cams, said means including plural-group withdrawal cams 17, 18 and needle restoring cams 19, 20.

25. A knitting machine having a circular series of needles and a carrier therefor, a plurality of knitting cams, means to knit tubular fabric on said needles by one of said knitting cams, and means for knitting a plurality of selvaged strips as integral continuations of said tubular fabric and upon the respective knitting cams, said means including plural-group withdrawal cams 17, 18, needle restoring cams 19, 20, and group-withdrawal cams 21, 22.

26. A knitting machine having a circular series of needles and a carrier therefor, a plurality of knitting cams, means to knit tubular fabric on said needles by one of said knitting cams, and means for knitting a plurality of selvaged strips as integral continuations of said tubular fabric and upon the respective knitting cams, said means including plural-group withdrawal cams 17, 18, needle restoring cams 19, 20, group withdrawal cams 21, 22 and group selective cams 23, 24, 25.

In testimony whereof, I have signed my name to this specification.

GEORGE P. BOSWORTH.